United States Patent
Zank et al.

(10) Patent No.: US 6,415,945 B1
(45) Date of Patent: Jul. 9, 2002

(54) FOOD SERVING AND PAN SYSTEM

(75) Inventors: Jeffrey T. Zank, Germantown; Jeffrey C. Mittmann, Plymouth; Rebecca J. Schreiber-Pethan, Sheboygan; Cory R. Boudreau, Madison; William C. Lindeman, Marshall, all of WI (US)

(73) Assignee: The Vollrath Company, L.L.C., Sheboygan, WI (US)

( * ) Notice: Subject to any disclaimer, the term of this patent is extended or adjusted under 35 U.S.C. 154(b) by 0 days.

(21) Appl. No.: 09/540,563

(22) Filed: Mar. 31, 2000

Related U.S. Application Data

(63) Continuation-in-part of application No. 09/285,205, filed on Apr. 1, 1999, now Pat. No. 6,349,843.

(51) Int. Cl.$^7$ .................................................. B65D 1/44
(52) U.S. Cl. ........................ 220/657; 206/499; 206/518; 206/519; 220/573.4; 220/756
(58) Field of Search .......................... 220/573.4, 573.5, 220/657, 670, 756, 759, 767, 768, 769, 770; 206/499, 514, 558, 518, 519; 99/426, 449; D7/500, 543, 545, 546, 549, 550.1, 552.1, 554.3, 588, 323, 331

(56) References Cited

U.S. PATENT DOCUMENTS

| | | |
|---|---|---|
| D103,671 S | 3/1937 | Connor |
| 2,644,443 A | 7/1953 | Barnsteiner |
| 2,646,762 A | 7/1953 | Ingraham et al. |
| 3,112,948 A | 12/1963 | Burns |
| 3,179,287 A | 4/1965 | Rickmeier, Jr. |
| D206,450 S | 12/1966 | Lloyd |
| 3,581,970 A | 6/1971 | Colato |
| D240,714 S | 7/1976 | White |
| 4,113,095 A | 9/1978 | Dietz et al. |
| 4,204,609 A | 5/1980 | Kuhn |
| 4,298,156 A | 11/1981 | Reifers et al. |
| D268,622 S | 4/1983 | Wolters et al. |
| D275,500 S | 9/1984 | Tyke |
| 4,616,762 A | 10/1986 | Alexander |
| D288,396 S | 2/1987 | Ritman |
| 4,660,734 A | 4/1987 | Heaney et al. |
| 4,828,112 A | 5/1989 | Vollrath et al. |

(List continued on next page.)

FOREIGN PATENT DOCUMENTS

| | | |
|---|---|---|
| DE | 93 21 150 | 7/1996 |
| GB | 19179 | of 1910 |
| GB | 463538 | 4/1937 |
| GB | 2 270 459 | 3/1994 |
| WO | 94/15152 | 7/1994 |

OTHER PUBLICATIONS

"Vollrath Super Pan" Catalog; Form No. 35001; 1986 The Vollrath Company, 4 pages.
"1989 Cambro Catalog"; First Edition; 6 total pages (cover page, pp. 2, 18–21).
"Rubbermaid Food Specialists"; F–200 Litho/5–78; 6 total pages.
"Polarware Food Service" Catalog; Revised May 1988; 4 total pages.
"Carlisle Foodservice Products" Catalog; 3 total pages (cover page, back page and p. 9).
"The Vollrath Catalog"; Form No. 34567; 1997 The Vollrath Company, 64 total pages.

Primary Examiner—Gary E. Elkins
(74) Attorney, Agent, or Firm—Foley & Lardner

(57) ABSTRACT

A pan for use with a well for receiving the pan is disclosed herein. The pan includes a bottom panel, a plurality of walls, and a ramp. The plurality of walls extend upwardly from the bottom panel and define a cavity. The plurality of walls also have an upper end which defines a top opening. The upper end has an extension away from the cavity which defines a rim. The ramp is proximate the rim and exterior to the cavity, whereby the pan rides up on the ramp when the pan is drawn up against the well.

48 Claims, 21 Drawing Sheets

U.S. PATENT DOCUMENTS

| | | |
|---|---|---|
| 4,967,908 A | 11/1990 | Kessler |
| 4,969,569 A | 11/1990 | Anders |
| 4,971,216 A | 11/1990 | Fortune |
| 5,018,623 A | 5/1991 | Hrenyo |
| 5,029,721 A | 7/1991 | Timpe |
| 5,045,672 A | 9/1991 | Scott |
| 5,131,708 A | 7/1992 | Denzin |
| D333,944 S | 3/1993 | Denzin et al. |
| 5,279,443 A | 1/1994 | Koda et al. |
| 5,392,948 A | 2/1995 | McEntee |
| 5,467,697 A * | 11/1995 | Hunziker .................... 99/449 |
| D365,501 S | 12/1995 | Daugherty et al. |
| 5,511,467 A | 4/1996 | Motley et al. |
| 5,626,256 A | 5/1997 | Onneweer |
| 5,628,427 A | 5/1997 | Hayes |
| 5,676,276 A | 10/1997 | Zielinski et al. |
| 5,769,261 A | 6/1998 | Gaffney et al. |
| 5,878,656 A | 3/1999 | Fletcher et al. |
| D417,361 S | 12/1999 | Mittmann et al. |
| 6,349,843 B1 * | 2/2002 | Mittmann et al. ....... 220/573.4 |

\* cited by examiner

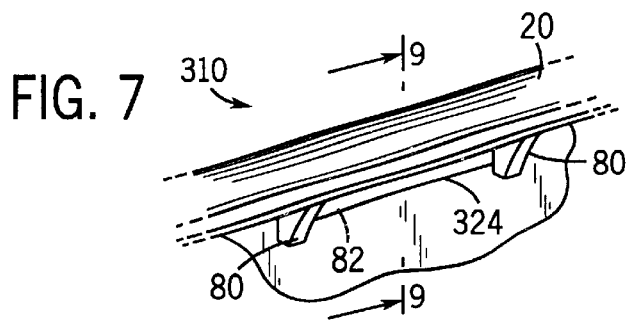
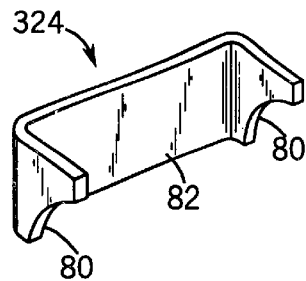
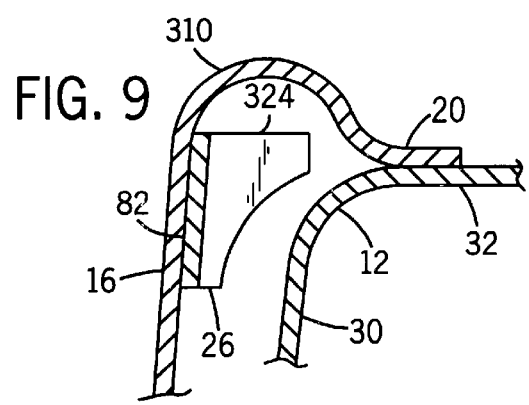
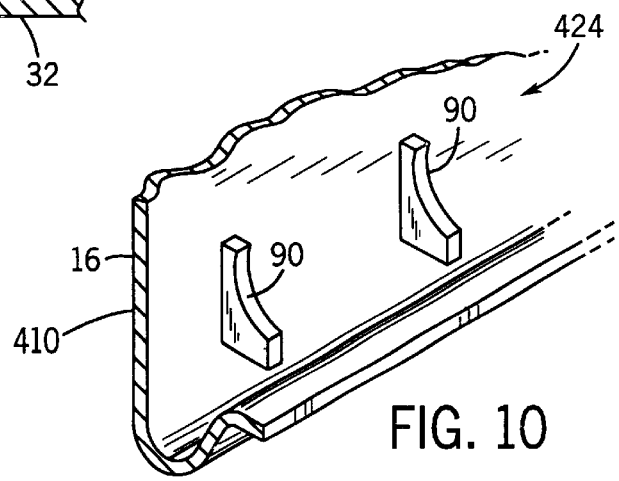
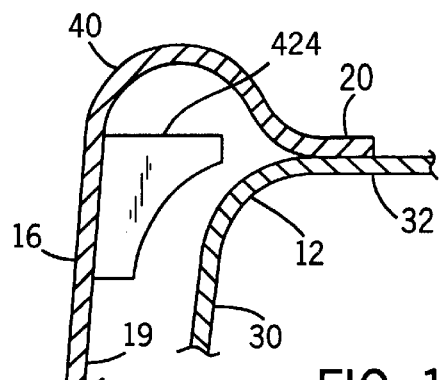

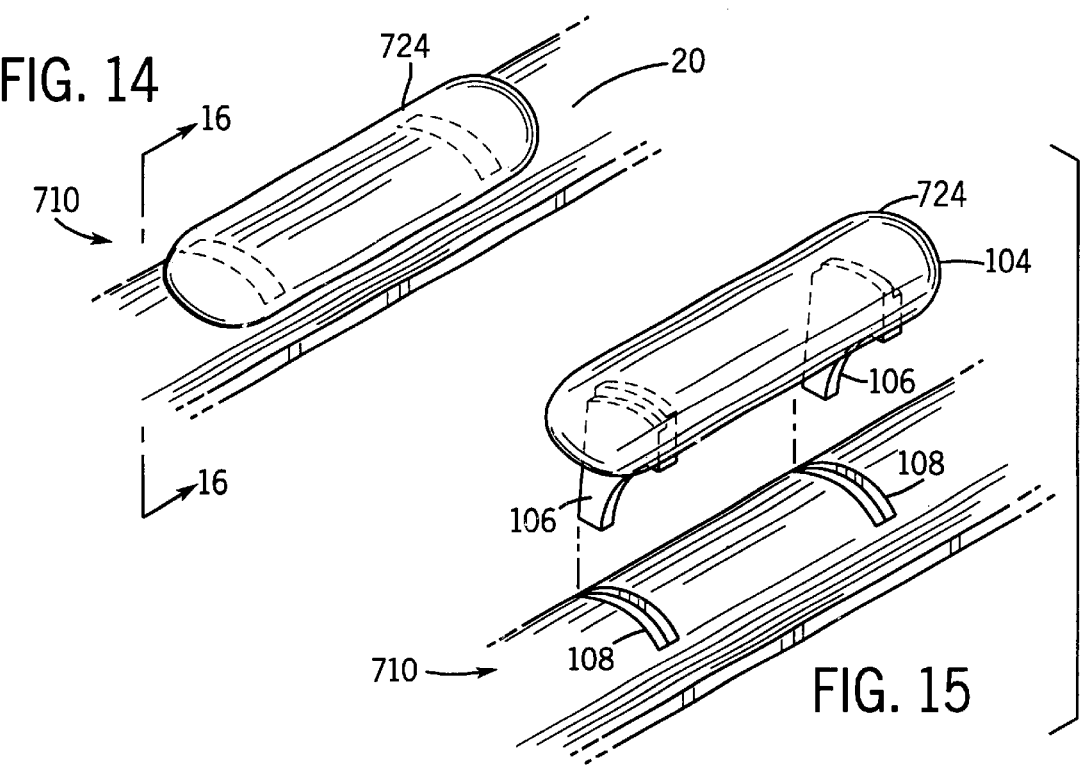
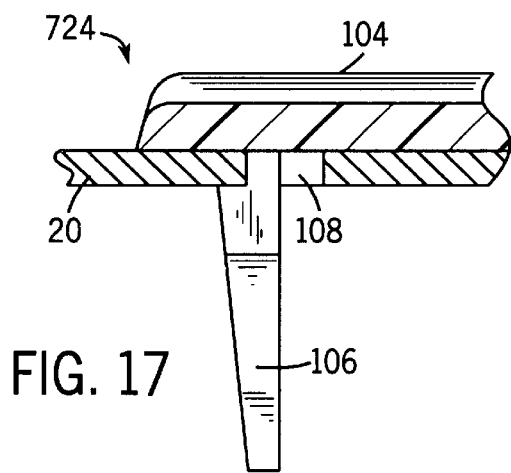
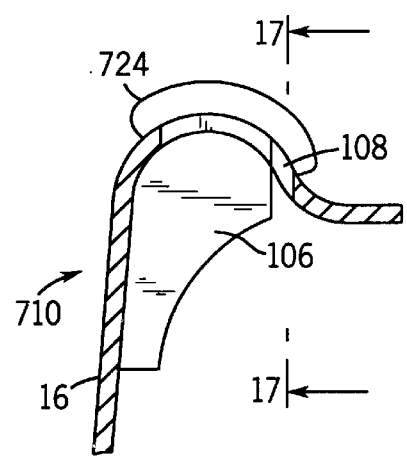

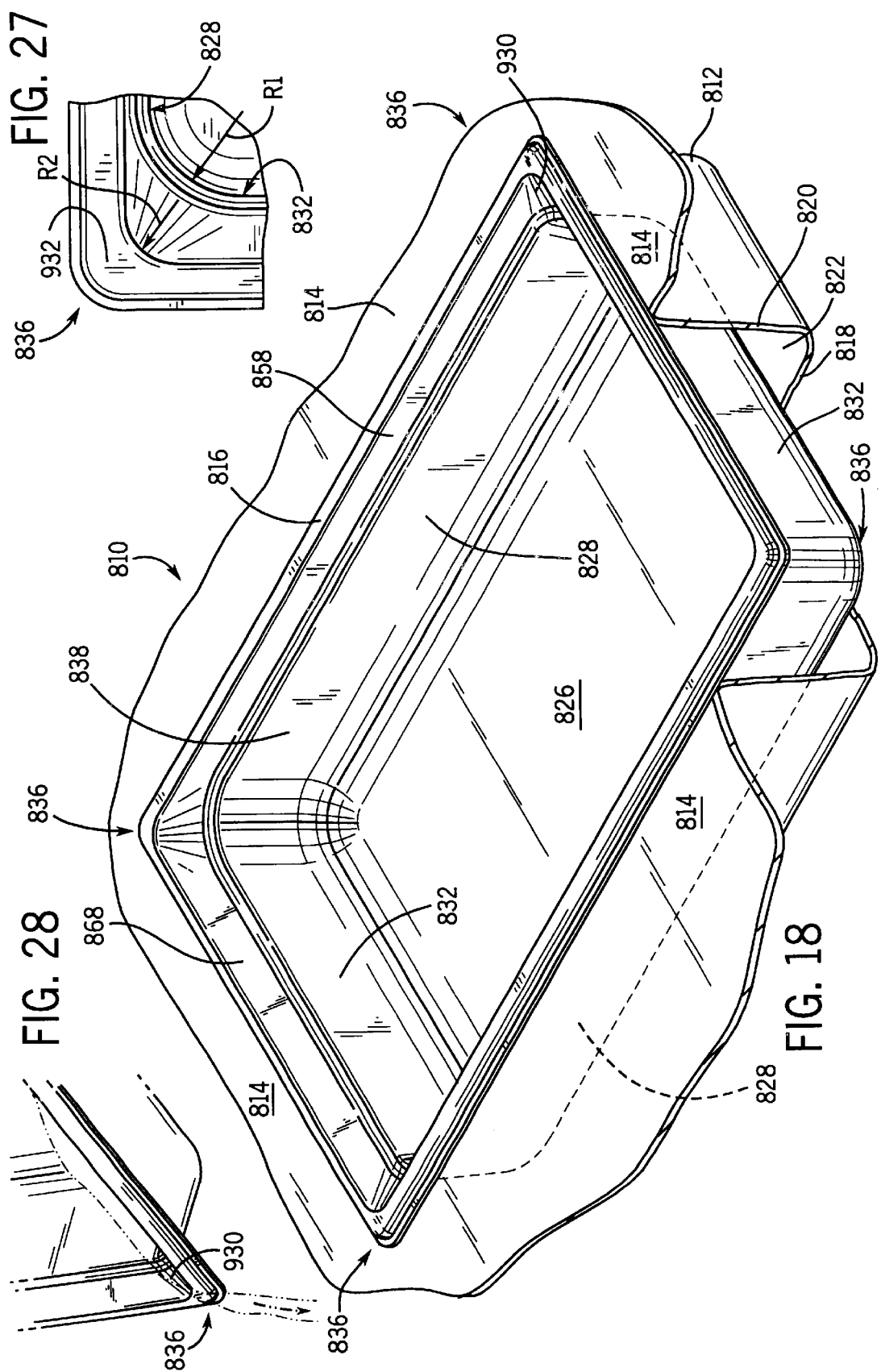

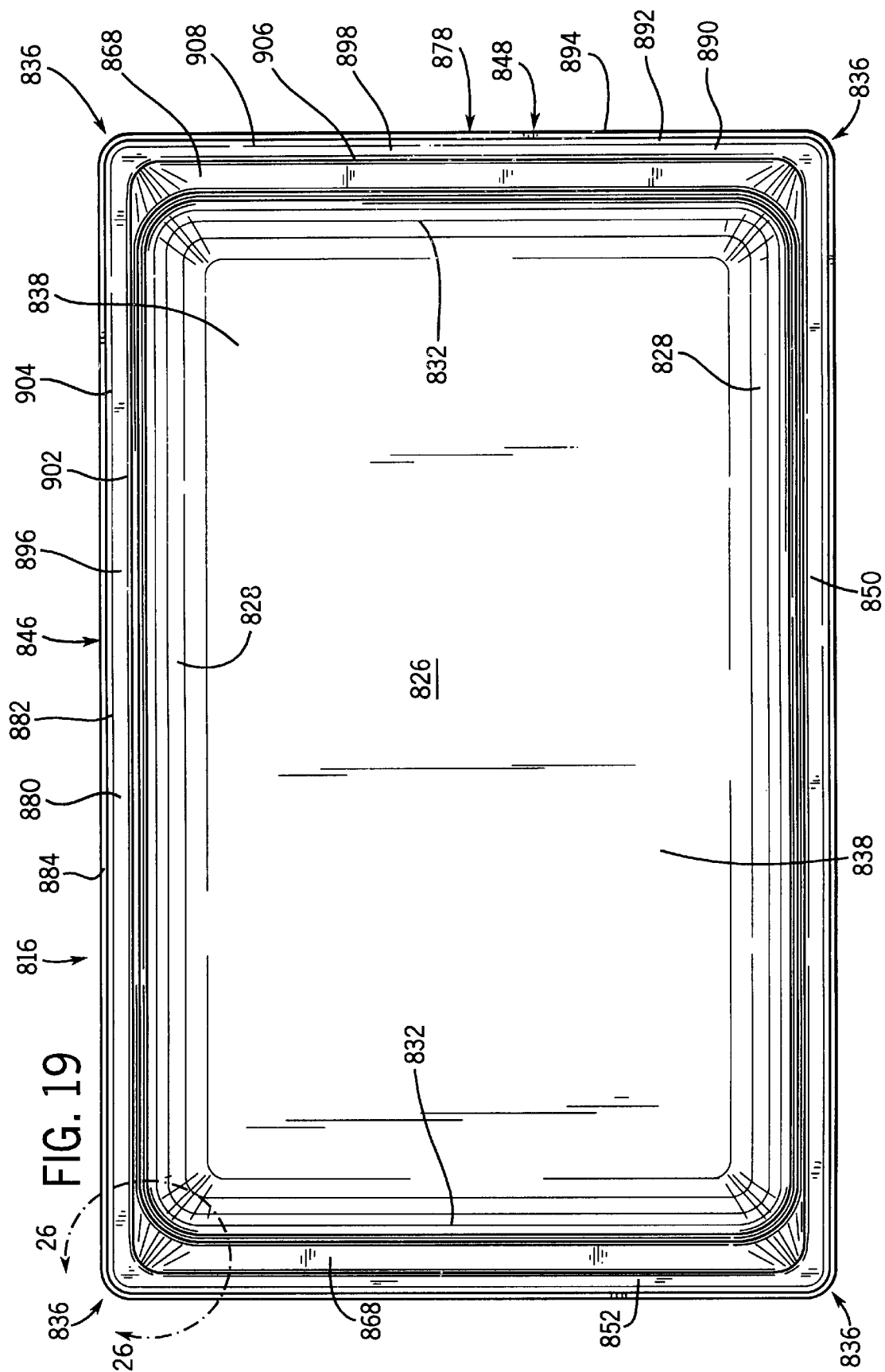

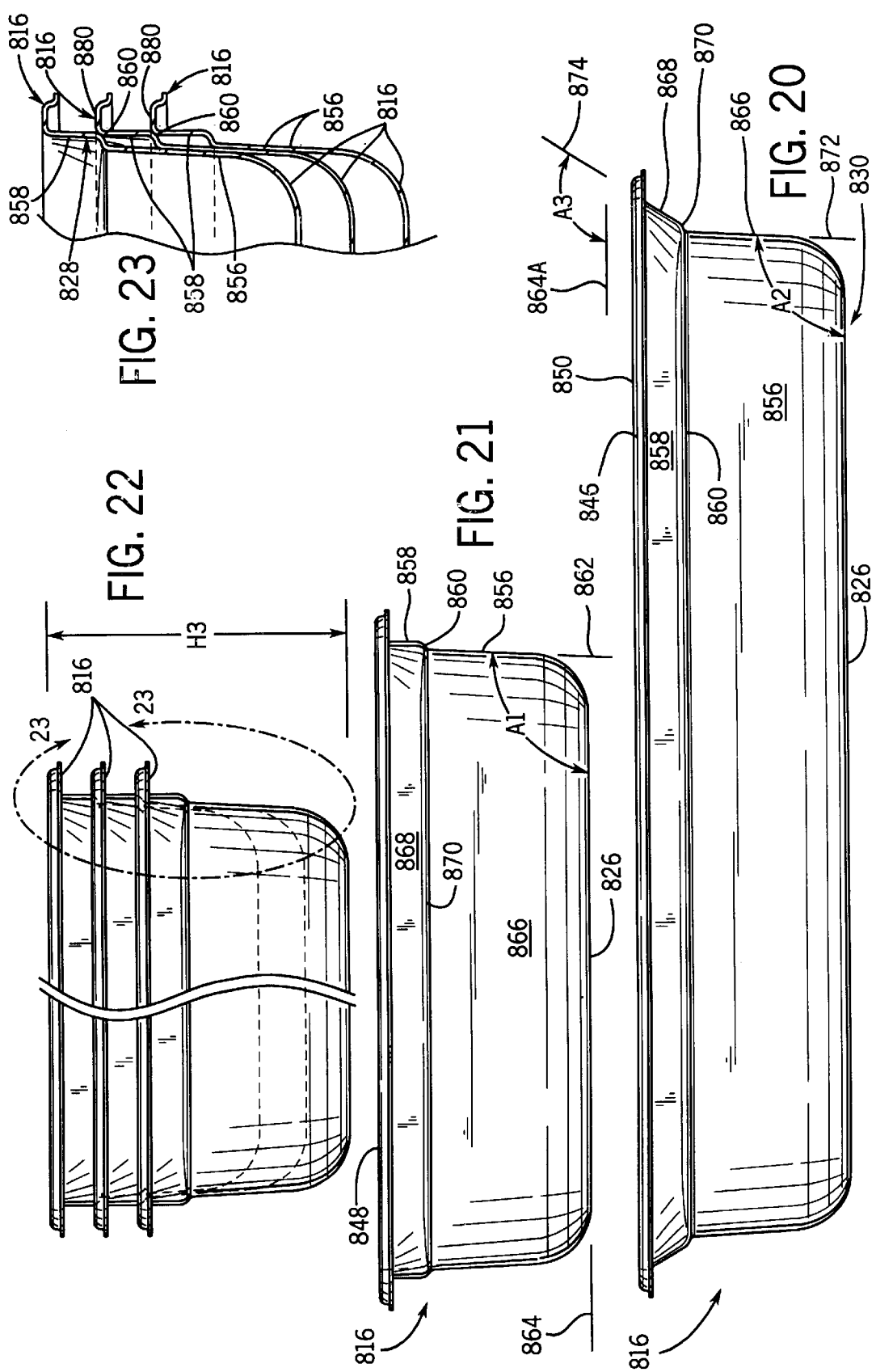

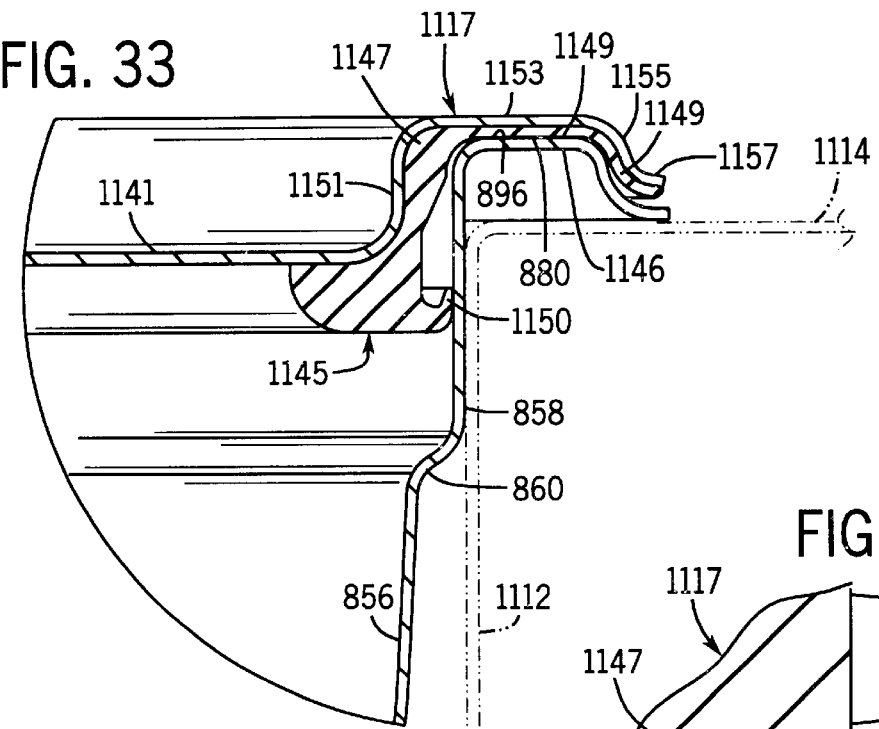
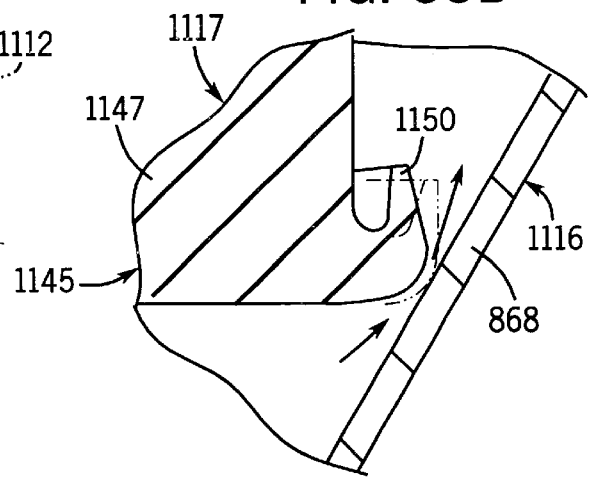
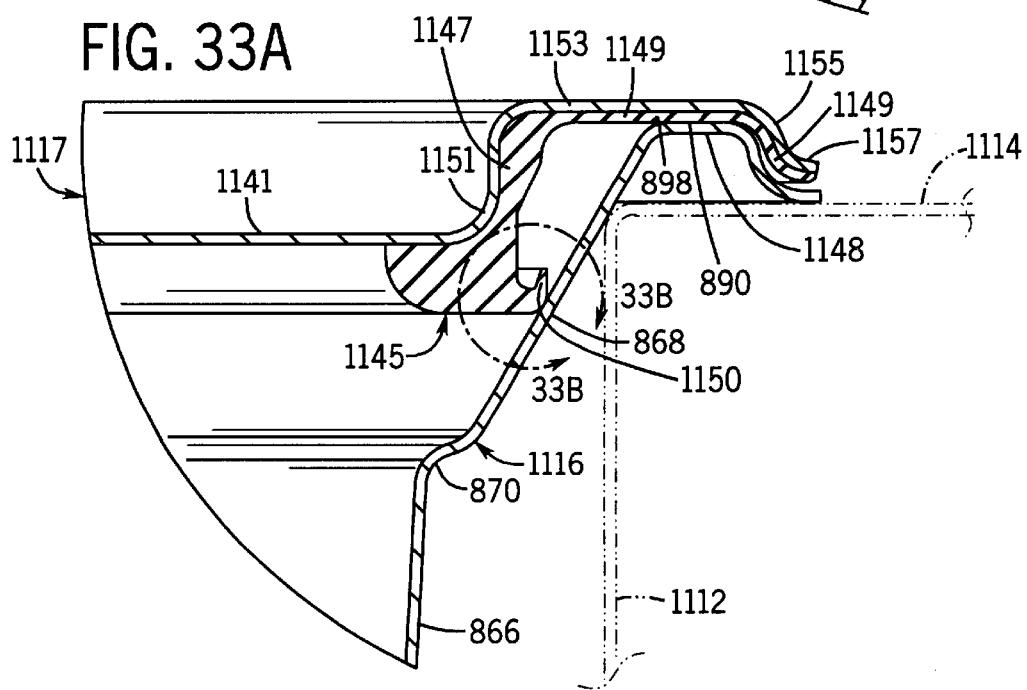

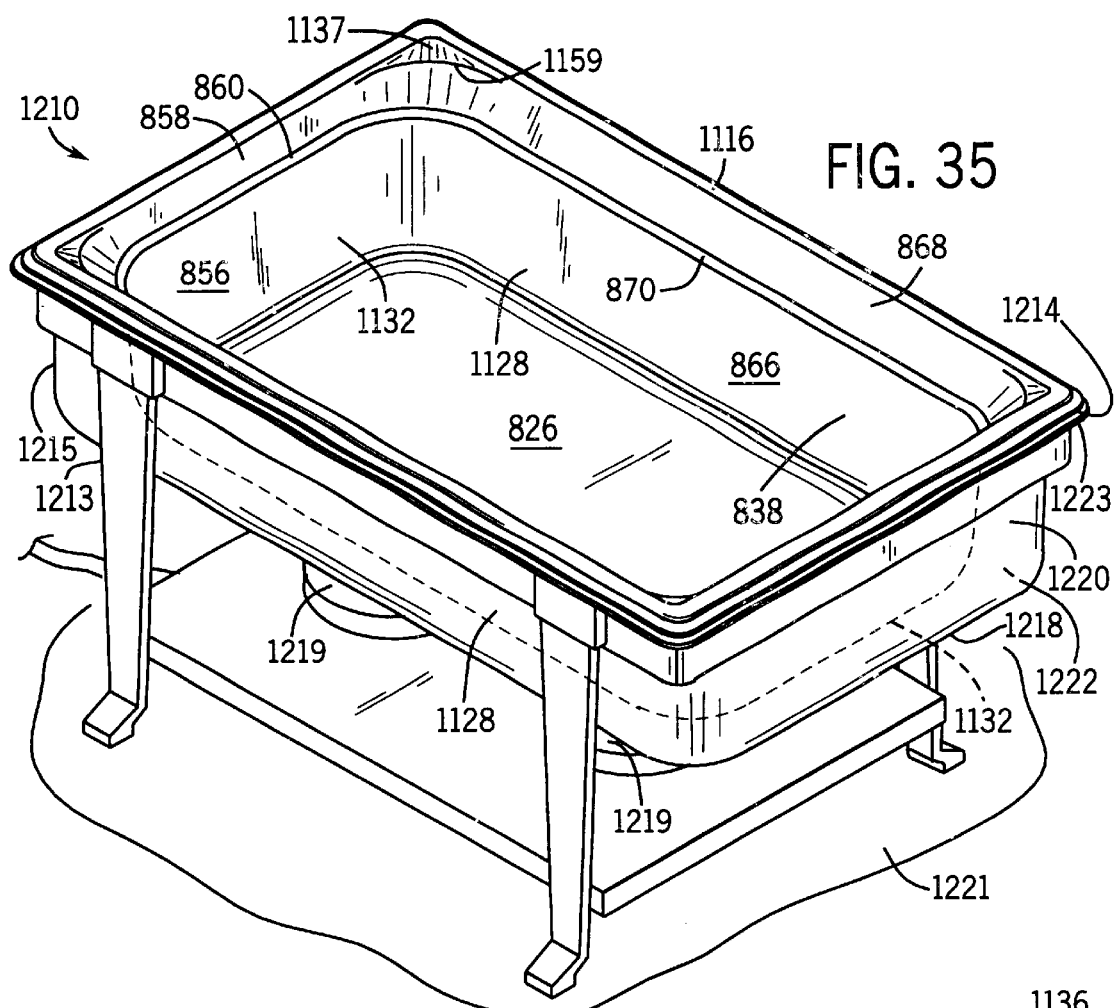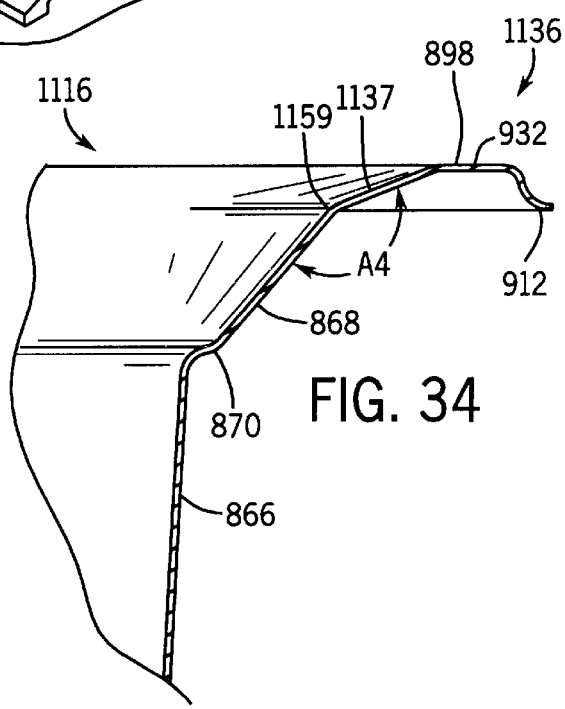

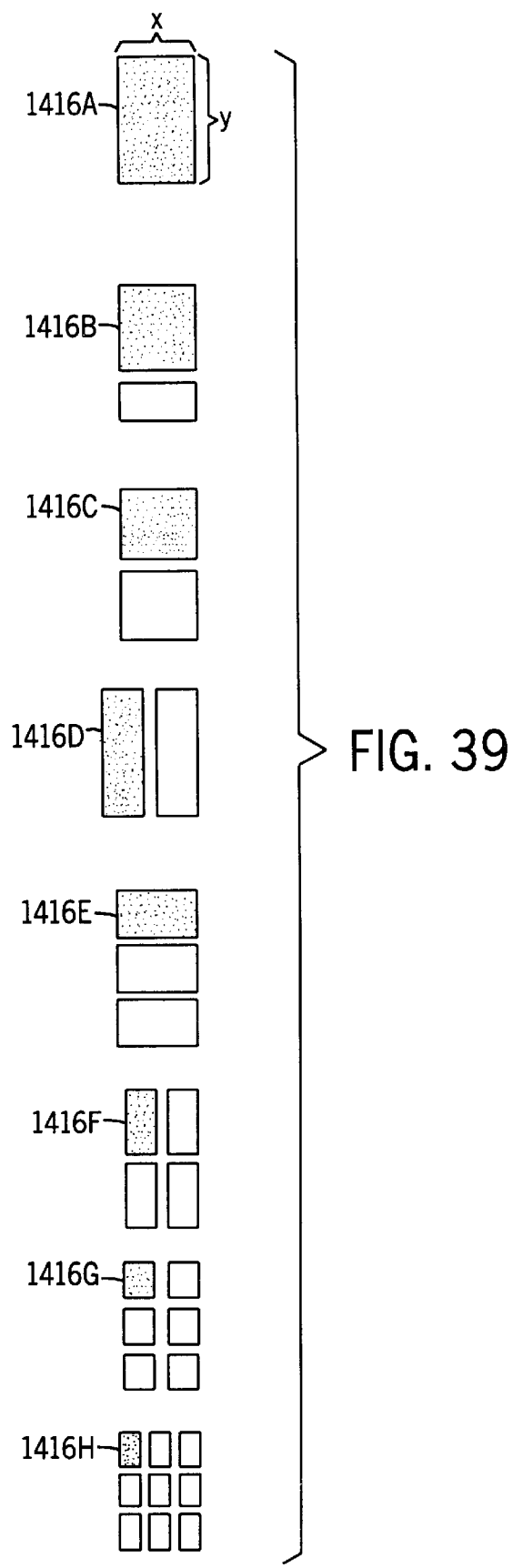

FOOD SERVING AND PAN SYSTEM

CROSS REFERENCE TO RELATED APPLICATIONS

The present continuation-in-part application claims priority under 35 U.S.C. §120 to U.S. patent application Ser. No. 09/285,205 entitled PAN REMOVAL RAMP and filed on Apr. 1, 1999, now U.S. Pat. No. 6,349,843, the full disclosure of which is hereby incorporated by reference.

FIELD OF THE INVENTION

The present invention relates generally to systems for serving food. In particular, the present invention relates to systems which support a removable food serving pan.

BACKGROUND OF THE INVENTION

Pans used in buffet or steam tables hold various kinds of hot and cold foods. In other settings, pans may also be removably placed in wells as to hold a variety of other non-food items. Characteristically, though, such pans are designed with a removable feature because they must be removed from tables or wells periodically.

In the case of food pans, they are removed from buffet or steam tables and replaced to replenish food or to clean the pan and the table. In addition to the removal capability, food pans must also be configured to provide a seal between the pan and the table such that steam or cold air below the pan (for example, in a well) will not escape around the edges of the pan. Maintaining the heat or cold below the pan serves a principle purpose of the use of food pans. That is, food pans make food accessible while keeping the food hot or cold.

Conventional food pans are typically constructed with a top edge extending outwardly and resting on the table or top of the well to provide a seal with the table or top of the well. Alternatively, food pans achieve a seal by having a downturned outer edge. While providing a seal, such designs make it difficult to remove the pans from the table or well. To remove the pans, for example, the edge of the pan must be lifted from the table or well by wedging either a utensil, finger, or other tool under the pan. This removal process can be cumbersome and dangerous because the surface under the edge of the pan may be very hot.

Thus, there is a need for a pan which is more easily removed from a buffet or steam table or well. Further, there is a need for a pan receiving and removal system whereby a pan and well are designed such that the pan is easily received into and removed from the well.

SUMMARY OF THE INVENTION

One embodiment of the invention relates to a pan for use with a well for receiving the pan, wherein the well is surrounded by a platform. The pan includes a bottom panel, a plurality of walls extending upwardly from the bottom panel and including a first wall, second wall and a third wall joined to the first and second walls at first and second corners, respectively, and a rim extending from the third wall. The third wall includes a first lower portion proximate the bottom panel and extending at a first angle relative to the bottom panel and a ramp portion extending between the lower portion and the rim at a second angle oblique to the lower portion and between about 105 degrees and about 150 degrees relative to the bottom panel. The ramp portion extends across a mid-point of the third wall between the first and second corners.

Another embodiment of the invention relates to a food serving system which includes a series of pans. Each pan includes a bottom panel, a plurality of walls extending upwardly from the bottom panel and including a first wall, a second wall, and a third wall joined to the first and second walls at first and second corners, respectively, and a rim outwardly extending from the third wall. The third wall includes a lower portion proximate the bottom panel and extending at a first angle relative to the bottom panel and a ramp portion extending between the lower portion and the rim at a second angle oblique to the lower portion. The series of plans includes a first rectangular pan having a width dimension X and a length dimension Y, a second rectangular pan having a width dimension X and a length dimension 1/2Y, and a third rectangular pan having a width dimension 1/2X and a length dimension 1/2Y.

Another embodiment of the invention relates to a food serving system including a well, platform and a pan. The well includes a first bottom and a first plurality of side walls extending upwardly from the bottom panel to form a cavity. Each of the plurality of side walls has an upper end. The platform extends away from the cavity at the upper end of the first plurality of side walls. The pan includes a bottom panel, a plurality of walls extending upwardly from the bottom panel and including a first wall, a second wall and a third wall joined to the first and second walls at first and second corners, respectively, and a rim outwardly extending from the third wall. The third wall includes a lower portion proximate the bottom panel and extending at a first angle relative to the bottom panel and a ramp portion extending between the lower portion in the rim at a second angle oblique to the lower portion.

Another embodiment of the invention relates to a food serving chafer. The chafer includes a stand, a water pan elevated by the stand, a heat source located beneath the water pan and a food serving pan. The water pan has a first bottom panel and a first plurality of side walls extending upwardly from the bottom panel to define a cavity. The first plurality of side walls has an upper end and a platform extending away from the cavity at the upper end of the first plurality of side walls. The food serving pan is at least partially inset within the cavity of the water pan and includes a bottom panel, a plurality of walls extending upwardly from the second bottom panel and including a first wall, a second wall, a third wall joined to the first and second walls at first and second corners, respectively, and a rim outwardly extending from the third wall. The third wall includes a first lower portion proximate the bottom panel and extending at a first angle relative to the bottom panel and a ramp portion extending between the lower portion and the rim at a second angle oblique to the lower portion.

Another embodiment of the invention relates to a food serving system which includes a water pan and a food serving pan. The water pan has a first bottom panel and a first plurality of side walls extending upwardly from the first bottom panel to form a cavity. The first plurality of side walls have an upper end. The water pan further includes a rim extending outwardly from the cavity at the upper end of the first plurality of side walls. The food serving pan includes a bottom panel, a second plurality of walls extending upwardly from the bottom panel and including a first wall, a second wall and a third wall joined to the first and second walls at first and second corners, respectively, and a rim outwardly extending from the third wall. The third wall includes a first lower portion proximate to the second bottom panel and extending at a first angle relative to the second bottom panel. The third wall further includes a ramp portion extending between the first lower portion and the rim at a second angle oblique to the lower portion.

Another embodiment of the invention relates to a covered pan system. The covered pan system includes a pan and a lid. The pan includes a bottom panel, a plurality of walls extending upwardly from the bottom panel and having a first wall, a second wall and third wall joined to the first and second walls at first and second corners, respectively, and a pan rim outwardly extending from the third wall. The third wall includes a first lower portion proximate the bottom panel and extending at a first angle relative to the bottom panel and a ramp portion extending between the lower portion and the rim at a second angle oblique to the lower portion. The lid includes a central portion, a lid rim extending about a perimeter of the central portion and configured to engage the pan rim and a gasket coupled to the lid. The gasket is configured to engage the ramp portion when the lid engages the pan rim.

Another embodiment of the invention relates to a pan for use of the well for receiving the pan, wherein the well is surrounded by a platform. The pan includes a bottom panel, a plurality of walls extending upwardly from the bottom panel and having a first wall, a second wall and a third wall joined to the first and second walls at first and second corners, respectively, and a rim outwardly extending from the third wall. The third wall includes a lower portion proximate the bottom panel and extending at a first angle relative to the bottom panel and a ramp portion extending between the lower portion and the rim at a second angle oblique to the lower portion and between about 105 degrees and about 150 degrees relative to the bottom panel. The ramp portion has a linear length such that the ramp portion has a vertical height of at least about 0.375 inches (9.5 mm).

BRIEF DESCRIPTION OF THE DRAWINGS

The invention will become more fully understood from the following detailed description, taken in conjunction with the accompanying drawings, wherein like reference numerals refer to like elements, in which:

FIG. 7 is a side view of a fourth exemplary embodiment of the pan of FIG. 3, including a ramp;

FIG. 8 is a perspective view of the ramp of FIG. 7;

FIG. 9 is a sectional view of the pan of FIG. 7, including the ramp;

FIG. 10 is a sectional, up-side-down view of a fifth exemplary embodiment of the pan of FIG. 3, including two ramps;

FIG. 11 is a sectional view of the pan and ramps of FIG. 10;

FIG. 14 is a perspective view of an eighth exemplary embodiment of the pan of FIG. 3, including a ramp with a mounting portion received into the pan;

FIG. 15 is a perspective view of the pan of FIG. 14, including the ramp removed from apertures in the pan;

FIG. 16 is a sectional view of the pan of FIG. 14, including the ramp with the mounting portion; and FIG. 17 is a front view of the upper end of the wall of the pan of FIG. 14, including the ramp with the mounting portion.

FIG. 18 is a perspective of a food serving system including a well and a pan within the well.

FIG. 19 is a top elevational view of the pan of FIG. 18.

FIG. 20 is a front elevational view of the pan of FIG. 18.

FIG. 21 is a right side elevational view of pan of FIG. 18.

FIG. 22 is a right side elevational view of a plurality of the pans nested within one another.

FIG. 23 is a sectional view of the nested plurality of pans of FIG. 22 taken along lines 23—23.

FIG. 27 is an enlarged top elevational view of the pan of FIG. 19 taken along lines 26—26.

FIG. 28 is a fragmentary perspective view illustrating the pan of FIG. 1 removed from the well and tilted to pour its contents.

FIG. 33 is a sectional view of the food serving system of FIG. 29 taken along lines 33—33.

FIG. 33A is a sectional view of the food serving system of FIG. 29 taken along lines 33A—33A.

FIG. 33B is a sectional view of the food serving system of FIG. 29 taken along lines 33A—33A illustrating release of internally built up pressure within the pan.

FIG. 34 is sectional view of the pan of FIG. 30 taken along lines 34—34.

FIG. 35 is a perspective view of a second alternative embodiment of the food serving system of FIG. 1.

FIG. 39 is a schematic illustration of the dimensional variations between the pan system of FIG. 38.

DETAILED DESCRIPTION OF THE PREFERRED EMBODIMENTS

Figure 1:
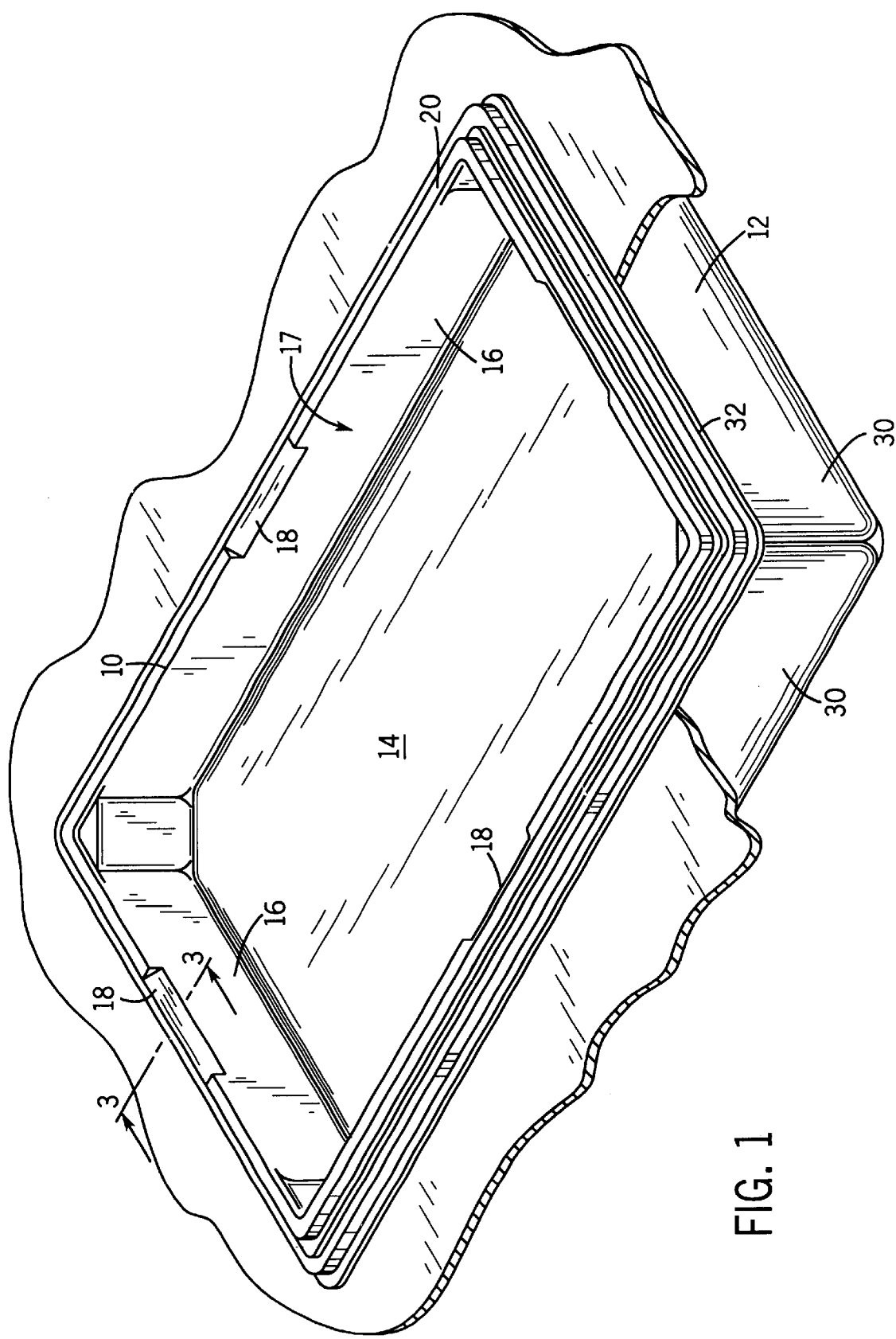
FIG. 1 is a perspective view of a pan received into a well in accordance with the present invention.

FIG. 1 is a perspective view of a pan 10 received into a well 12. Pan 10 includes a bottom panel 14, a plurality of walls 16, and indicators 18. Bottom panel 14 and at least one wall 16 are imperforate. Alternatively, panel 14 and at least one of walls 16 may include perforations depending upon the intended use of pan 10. Walls 16 extend upwardly from bottom panel 14 and define a cavity 17. Walls 16 have an upper end defining a top opening. Each upper end of walls 16 has an extension away from cavity 17 defining a rim 20. Rim 20 alternatively forms a concavity facing bottom panel 14. Indicators 18 are indentations or depressions in the upper end of plurality of walls 16. Indicators 18 indicate the location of a ramp for removing pan 10 from well 12 under rim 20.

Well 12 includes a bottom panel and a plurality of side walls 30. Side walls 30 extend upwardly from bottom panel of well 12 and define a cavity 19 (shown in FIG. 3). Side walls 30 have an upper end defining a top opening. The upper end of side walls 30 has an extension away from cavity 19 defining a platform 32. Rim 20 and platform 32 engage to form a seal when pan 10 is received into well 12.

The exemplary embodiment shows pan 10 received into a well 12 where well 12 is a water pan. Alternatively, well 12 is integrally formed as part of a single unitary body with a buffet or steam table. Further, well 12 may be provided in a chafer, a marmite, a countertop warmer, a portable warmer, a drop-in warmer, or any other structure with a bottom panel, plurality of side walls, and a cavity for receiving pans.

In the exemplary embodiment, pan 10 and well 12 are rectangular in shape. Pan 10 and well 12 are alternatively any of a variety of shapes. Pan 10 and well 12 are preferably made of stainless steel and have a thickness of approximately 0.030 inches (0.762 mm)(22 gauge). Manufacturing considerations and different intended uses of pan 10 and well 12 suggest that a variety of different materials and thicknesses may be desired for pan 10 and well 12.

Figure 2:
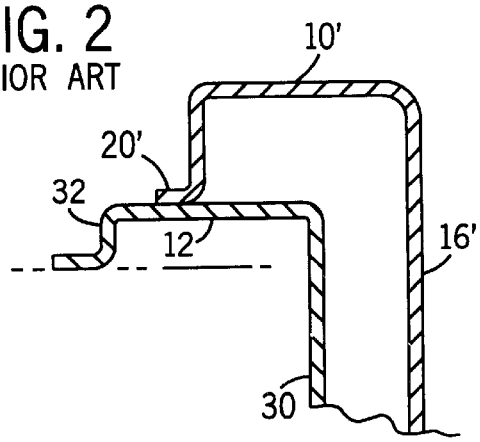
FIG. 2 is a sectional view of walls of a conventional pan and well.
Figure 3:
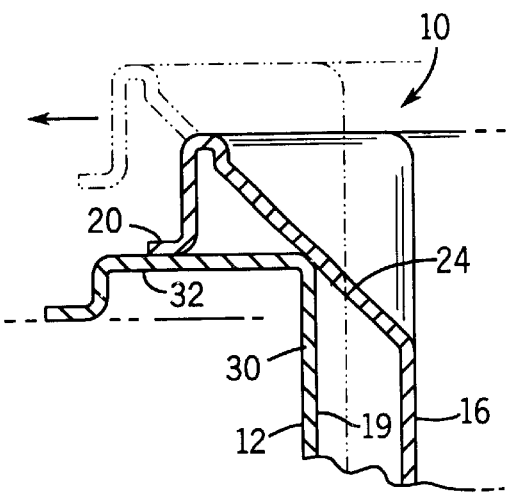
FIG. 3 is a sectional view of the pan and well of FIG. 1, including a ramp.

FIGS. 2 and 3 are side-by-side comparisons of a conventional pan 10' and pan 10, respectively, received within a well 12. As shown by FIG. 2, conventional pan 10' includes a wall 16' and a rim 20' extending from wall 16'. In the conventional design, rim 20' must be lifted from platform 32 by wedging a utensil or finger underneath rim 20' in order to remove conventional pan 10' from well 12. Thus, lifting of rim 20' is cumbersome and inconvenient.

In contrast, as shown by FIG. 3, the upper end of wall 16 of pan 10 includes rim 20 and a ramp 24. Ramp 24 is an inclined plane or surface extending between wall 16 and rim 20. Ramp 24 is integrally formed as part of a single unitary body with one of the walls 16 of pan 10. Further, ramp 24 is configured to fit in a gap between well 12 and pan 10 when pan 10 is received into well 12. In the exemplary embodiment, ramp 24 makes an angle of approximately 45 degrees with respect to the plane of bottom panel 14 of pan 10 (135 degrees when the angle is taken from the inside of pan 10). Ramp 24 alternatively makes an angle ranging from 15 to 60 degrees with respect to the plane of bottom panel 14 (105 to 150 degrees when the angle is taken from the inside of the pan).

Pan 10 is removed from well 12 by the exertion of a force on wall 16 of pan 10 away from cavity 17. The exerted force engages ramp 24 against side wall 30. Ramp 24 provides a surface for pan 10 to slide up side wall 30 of well 12. Ramp 24 advantageously raises rim 20 above platform 32, where a user can secure a hold on pan 10 for complete removal of pan 10 from well 12. Thus, the cumbersome conventional process is avoided.

Figure 4:
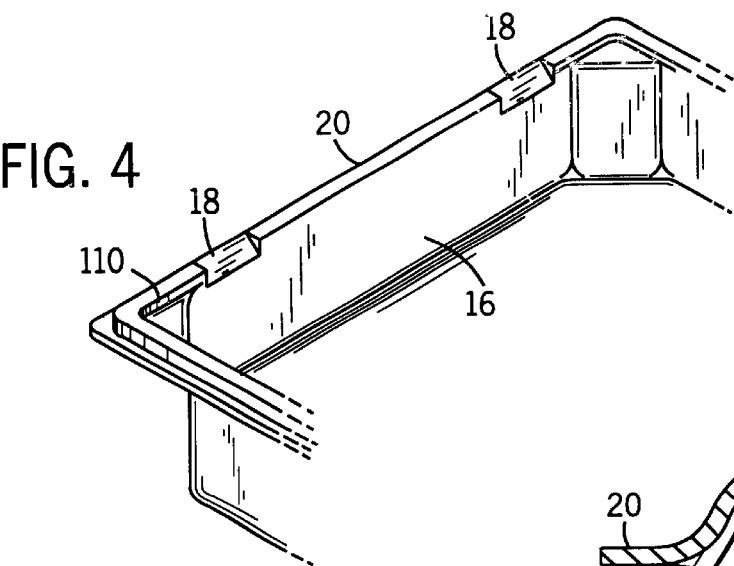
FIG. 4 is a perspective view of a second exemplary embodiment of the pan and well of FIG. 3.

FIG. 4 is a perspective view of a pan 110, a second exemplary embodiment of pan 10. Pan 110 is identical to pan 10 except pan 110 includes two indicators 18 at the upper end of the same wall 16. Indicators 18 provide a telltale, indication, or mark as to the location of ramps 24 beneath rim 20. Two ramps below indicators 18 are advantageously spaced apart on the same wall 16 to provide greater stability to pan 110 during removal from well 12. Ramps are alternatively located on any one of opposite longer longitudinally extending walls 16, opposite shorter transversely extending walls 16, adjacent walls 16, and all walls 16.

Although the exemplary embodiment shows indicators 18 as depressions in the upper end of walls 16, indicators 18 may alternatively comprise protrusions or handles, providing a place for a user's fingers to grip when removing pan 10 from well 12. Depressions are formed in the manufacturing of pan 10. No new material is introduced and no additional assembly steps are required beyond drawing and stamping during the manufacturing of pan 10.

Figure 6:
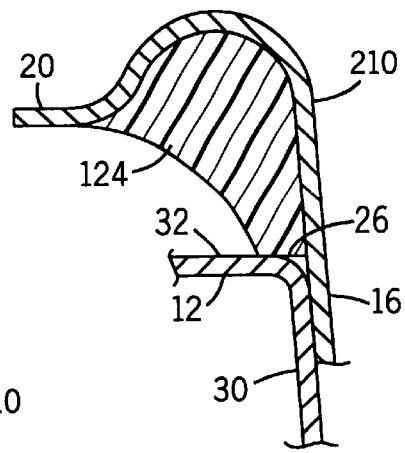
FIG. 6 is a sectional view of the pan and well of FIG. 5, the pan being removed from the well.
Figure 5:
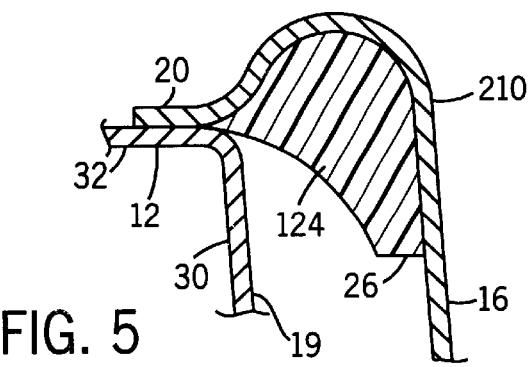
FIG. 5 is a sectional view of a third exemplary embodiment of the pan and well of FIG. 3, the pan being received into the well.

FIGS. 5 and 6 are sectional views of a pan 210, a third exemplary embodiment of pan 10. Pan 210 is identical to pan 10 except pan 210 includes a ramp 124. Ramp 124 is an alternative embodiment of ramp 24 and is identical to ramp 24 except that ramp 124 is arcuate and fills the concavity or space between rim 20 and wall 16.

In the exemplary embodiment, ramp 124 includes a resting surface 26. As shown in FIG. 6, resting surface 26 provides a surface which at least partially rests on platform 32 when pan 10 is drawn up against side walls 30 for removal of pan 10 from well 12. Surface 26 resting on platform 32 keeps pan 210 in a raised position while user places fingers under rim 20 to completely remove pan 210 from well 12. Resting surface 26 is illustrated as preferably being a flat area. Resting surface 26 also enables steam to slowly escape from well 12 before pan 210 is lifted. Resting surface 26 is alternatively a pointed area or any other surface which is capable of resting on platform 32.

FIG. 7 is a sectional view of a pan 310, a fourth exemplary embodiment of pan 10. Pan 310 is identical to pan 10 except pan 310 includes a ramp 324. Ramp 324 is an alternative embodiment of ramp 24. As shown in FIG. 8, ramp 324 includes two inclined surfaces 80 coupled together by a mounting portion 82 and mounted on wall 16. As shown in FIG. 9, mounting portion 82 provides a surface for ramp 324 to be mounted to wall 16 of pan 310 as well as additional support for two inclined surfaces 80. Ramp 324 also includes resting surface 26 which is capable of resting on platform 32 when pan 310 is removed from well 12.

FIG. 10 is a sectional, up-side-down view of a pan 410, a fifth exemplary embodiment of pan 10. Pan 410 is identical to pan 10 except pan 410 includes a ramp 424. Ramp 424 is an alternative embodiment of ramp 24 and is identical to ramp 324 except that ramp 424 does not have a mounting portion 82. Ramp 424 includes two inclined surface portions 90 which are individually mounted to wall 16 of pan 10. As shown in FIG. 11, inclined surfaces 90 provide a surface against which pan 410 rides up when removed from well 12.

Figure 12:
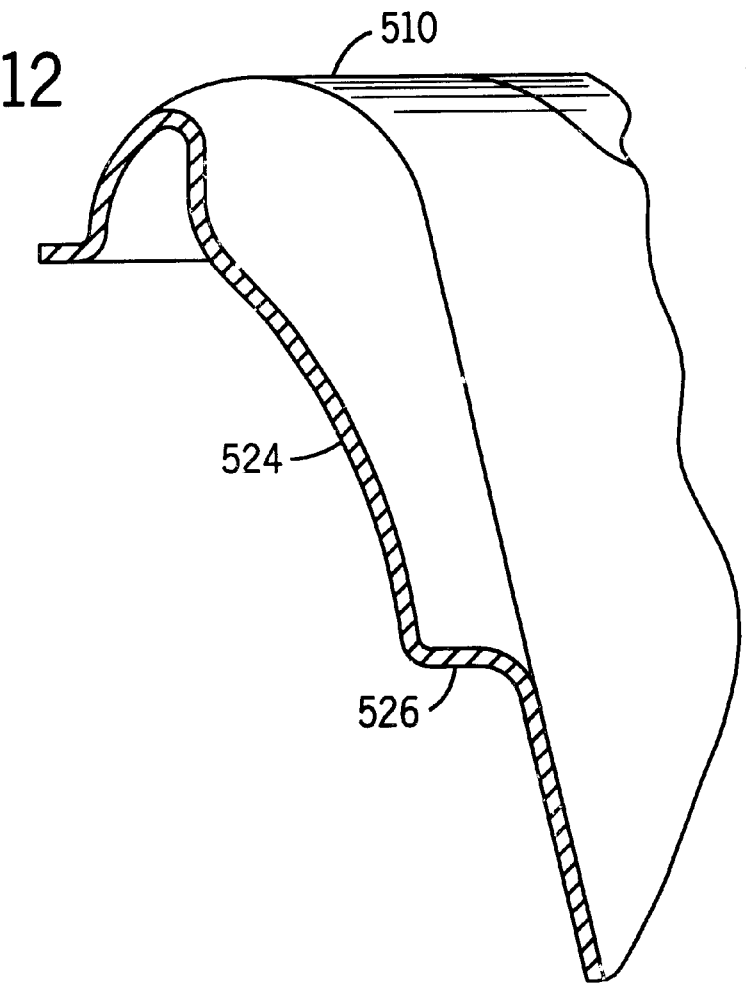
FIG. 12 is a sectional view of a sixth exemplary embodiment of the pan of FIG. 3.

FIG. 12 is a sectional view of a pan 510, a sixth exemplary embodiment of pan 10. Pan 510 is identical to pan 10 except pan 10 includes a ramp 524. Ramp 524 is an alternative embodiment of ramp 24 and is identical to ramp 24 except that ramp 524 has an inclined surface which is arcuate in shape. Further, ramp 524 includes a resting surface 26. Resting surface 26 provides a surface which at least partially rests on platform 32 when pan 510 is drawn up against side walls 30 for removal of pan 510 from well 12.

Figure 13:
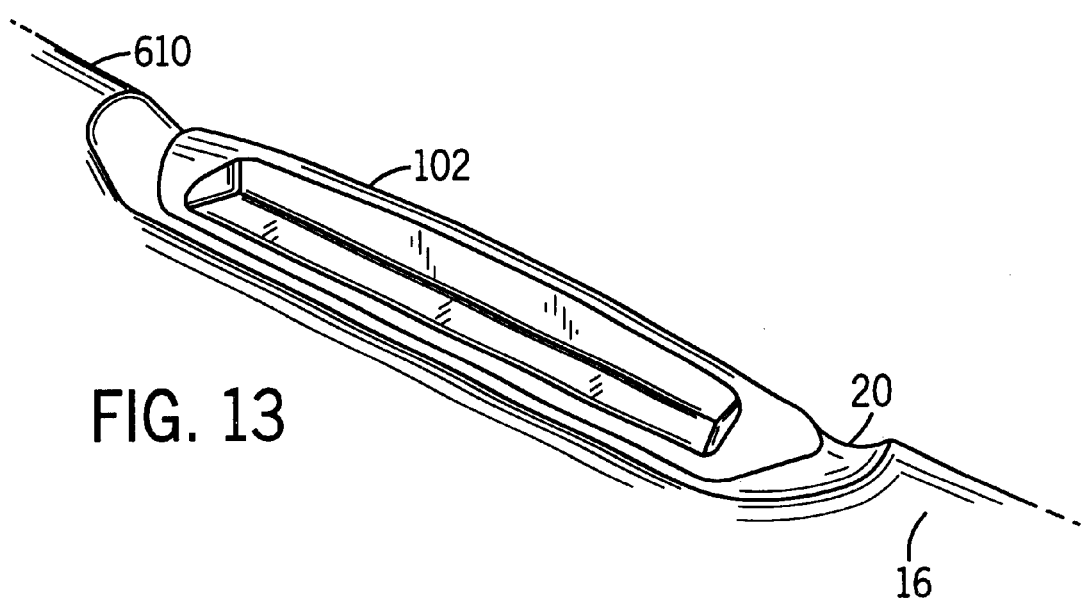
FIG. 13 is a perspective view of a ramp indicating handle on a seventh exemplary embodiment of the pan of FIG. 3.

FIG. 13 is a perspective view of a handle 102 on wall 16 of a pan 610, a seventh exemplary embodiment of pan 10. Pan 610 is identical to pan 10 except that in place of indicator 18, pan 610 has handle 102. Like indicator 18, handle 102 is located on the opposite side of wall 16 from ramp 24. As such, handle 102 provides an indication or mark as to the location of ramp 24. Handle 102 is configured to receive a user's fingers such that removal of pan 610 using ramp 24 is more easily achieved.

Alternate designs of handle 102 can be used to both mark the location of a ramp and provide a surface to grip the upper portion of wall 16 of pan 10. Further, color coding of handle 102 is alternatively employed to indicate a variety of features. For example, a certain colored handle 102 may indicate a certain type of food or type of food preparation for a particular pan 610. Different colors may alternatively indicate different food preparation stages.

FIGS. 14 and 15 are perspective views of a pan 710, an eighth exemplary embodiment of pan 10. Pan 710 is identical to pan 10 except that pan 710 includes a ramp 724. Ramp 724 is mounted in rim 20 and is an alternative embodiment of ramp 24. As shown in FIG. 15, ramp 724 includes a mounting portion 104 and fingers 106. Mounting portion 104 serves as an indicator or marker as to the location of ramp 724. Like indicator 18 (FIG. 1) or handle 102 (FIG. 14), mounting portion 104 is alternatively color coded for a variety of uses. Further, mounting portion 104 is designed in a variety of different shapes which are capable of receiving a user's fingers during removal of pan 710 from well 12. Mounting portion 104 is alternatively included in rim 20.

As shown in FIGS. 16 and 17, fingers 106 of ramp 724 extend below mounting portion 104 though apertures 108 in pan 710. Once fingers 106 are received into apertures 108, ramp 724 provides a surface for pan 710 to slide up side wall 30 of well 12. Fingers 106 are adapted flex between a first pan engaging position and a second pan disengaging position. In the exemplary embodiment, fingers 106 are squeezed toward each other when in the second pan disengaging position. In the second pan disengaging position, fingers 106 are removably received through apertures 108 in rim 20. Thus, ramp 724 is capable of easy removal from pan 710 for cleaning and/or repair. Such capability is advantageous with food pans in particular because sanitation of the pans is so important.

Ramps 24, 124, 324, 424, 524, and 724 each allow pan 10 to be more easily removed from a buffet or steam table or well. Easier removal makes use of pans including ramps 24, 124, 324, 424, 524, or 724 more convenient than those without. Further, removal of pan 10 using ramps 24, 124, 324, 424, 524, and 724 does not require the use of utensils. Nevertheless, where utensils are used, ramps 24, 124, 324, 424, 524, and 724 facilitate the use of utensils. Further, resting surface 26 of ramps 24, 124, 324, 424, 524, and 724 also provides for easier removal of pan 10 from well 12. Indicator 18, handle 102, and mounting portion 104 provide a telltale, indication, or mark as to the location of ramps 24, 124, 324, 424, 524, and 724 in pan 10. Indicator 18, handle 102, and mounting portion 104 are advantageously adapted to receive a user's fingers to even further facilitate removal of pan 10 from well 12.

While ramps 24, 124, 324, 424, 524, and 724 improve in the removal of pan 10 from well 12, each also maintains the ease of proper cleaning of pan 10 and well 12. Such cleaning is important in the use of pan 10. Ramps 24, 124, 324, 424, 524, and 724 are further each easily manufactured. The simplicity and low cost of ramps 24, 124, 324, 424, 524, and 724 are particularly advantageous to the solution each provides. Ramps 24, 124, 324, 424, 524, and 724 allow pan 10 and well 12 to cooperate as a pan receiving and removal system, providing easy receipt and removal of pan 10 into and out of well 12.

It is understood that, while the detailed drawings and specific examples given describe the preferred embodiments for the present inventions, they are for purpose of illustration only. The present invention is not limited to the precise details, methods, materials, and conditions disclosed. For example, although various shapes, locations, and formation methods of ramps 24, 124, 324, 424, 524, and 724 are suggested, others may be used.

FIG. 18 is a perspective view of food serving system 810 generally including well 812, platform 814 and pan 816. Well 812 comprises a conventionally known well formed as a single unitary body with a buffet or steam table. Well 812 generally includes bottom panel 818 and side walls 820 which extend upwardly from bottom panel 818 to define an internal cavity 822. Internal cavity 822 is sized to receive pan 816 and is further sized to receive a heating or cooling medium such as water or ice. Platform 814 comprises a generally horizontal surface extending about the exterior of cavity 822 and adapted to provide a landing surface upon which pan 816 rests and is supported within cavity 822 above bottom panel 818. Although platform 814 is illustrated as being integrally formed as part of a single unitary body with side walls 820, platform 814 may alternatively be fixedly secured to side walls 820 by a conventionally known attachment methods. Although pan 816 is illustrated as being used with a permanent well 812 of a buffet or a steam table, pan 816 may alternatively be used in conjunction with other structures which provide a well having a cavity sized to receive the pan and a platform about the cavity, such as a chafer, a marmite, a countertop warmer, a portable warmer, a drop-in warmer or the like.

FIGS. 19–21 illustrates pan 816 in greater detail. Pan 816 generally includes bottom panel 826, side walls 828 and end walls 832 which are joined at corners 836 to form interior 838, side rims 846 and end rims 848. Bottom panel 826 is integrally formed as part of a single unitary body with walls 828, 832 and is adapted to extend generally parallel to bottom panel 818 of well 812 when positioned within cavity 822 (as shown in FIG. 18).

Side walls 828 extend along the major dimensions of pan 816 opposite one another. Side walls 828 are substantially identical to one another and include lower portion 856, upper portion 858 and shoulder 860. Although lower portion 856 is generally rounded at the juncture of lower portion 856 and bottom panel 826, each lower portion 856 generally extends in plane 862 while bottom panel 826 generally extends in a plane 864. As shown by FIG. 21, lower portion 856 extends upwardly from bottom panel 826 at an angle A1 of between about 90 degrees and 105 degrees between planes 862 and 864. In the exemplary embodiment, angle A1 is approximately 93 degrees. Because lower portion 856 extends at a slight outward angle A1 relative to bottom panel 826, lower portion 856 facilitates the nesting of multiple identical pans 816 as described hereafter with respect to FIGS. 22–25.

Upper portion 858 extends upwardly between lower portion 856 and rim 846. Upper portion 858 preferably extends in a plane angularly offset from plane 864 of bottom panel 826 by between about 90 degrees and 93 degrees. In the exemplary embodiment, upper portion 858 extends in a plane substantially perpendicular to plane 864 in which bottom panel 826 extends. Upper portion 858 is preferably offset from lower portion 856 so as to extend further outside to interior 838 and so as to form shoulder 860.

Shoulder 860 extends between lower portion 856 and upper portion 858 along each of walls 828, 832. As will be described in greater detail with respect to FIGS. 22 and 23, shoulder 860 rests upon rim 846 of a lower pan 816 when multiple pans 816 are nested. In the exemplary embodiment, shoulder 860 has a width of about 0.125 inches (3.2 mm) and is bound on opposite sides by two radii of about 0.125 inches (3.2 mm). In addition to supporting pan 816 in relationship to an underlying pan 816 when multiple pans are nested, shoulder 860 in combination with shoulder 870 (described hereafter) also serve as a fill indicator for portion control. In the exemplary embodiment, upper portion 858 has a vertical height of about 0.879 inches (2.23 mm) between shoulder 860 and rim 846 such that shoulder 860 is correspondingly spaced from rim 846.

End walls 832 are substantially identical to one another and extend along the opposite shorter sides of pan 816. Each end wall 832 generally includes lower portion 866, ramp portion 868 and shoulder 870. Lower portion 866 extends between side walls 828 from bottom panel 826 to shoulder 860 and upper portion 868. Although lower portion 866 and bottom panel 826 are generally rounded at their juncture, lower portion 866 generally extends within a plane 872 (shown in FIG. 20) that extends upwardly from plane 864 of bottom panel 826 at an angle A2. Angle A2 is preferably equal to angle A1. Because angle A2 is preferably greater than 90 degrees, end walls 832 facilitate the nesting of multiple identical pans 816.

Ramp portion 868 extends between lower portion 866 and rim 850. In particular, ramp portion 868 extends at least adjacent to and preferably across those portions of end rim 848 which contact platform 814 (shown in FIGS. 18 and 21A) to support pan 816 within cavity 822 of well 812. In particular, ramp portion 868 provides an exterior sloped or inclined surface of at least a portion of which simultaneously extends horizontally across from and below platform engaging surface 912 (described hereafter) and outwardly beyond an outermost surface of the remainder of end wall 832, namely outwardly beyond an outermost surface of lower portion 866. Ramp portion 868 generally extends in a plane 874 that is angularly spaced from plane 864A which is parallel to plane 864 in which bottom panel 826 extends by an angle A3 (as indicated in FIG. 20). Angle A3 is between about 105 degrees and about 150 degrees. Angle A3 is optimally between about 120 degrees and about 135 degrees to achieve the greatest vertical lift per the amount of horizontal force necessary when moving ramp portion 868 against a corner of the well. It has been found that angle A3 best serves to facilitate the lifting and removal of pan 816 from well 812. Ramp portion 868, further extends in plane 874 which is oblique to plane 872 in which lower portion 866 extends.

As best shown by FIGS. 18 and 19, ramp portion 868 preferably extends across a mid point 878 between side walls 828 and between corners 836. Because ramp portion 868 extends across mid point 878, both corners 836 adjacent to end wall 832 are simultaneously and uniformly lifted above platform 814 as pan 816 is pulled in a direction towards end wall 832. In the exemplary embodiment, ramp portion 868 preferably extends continuously along the entire length of end walls 832 from one corner 836 to another corner 836. As a result, ramp portion 868 does not have any abrupt edges or surface con-cavities. In fact, neither lower portion 866, ramp portion 868 nor shoulder 870 have any surface cavities. Neither lower portion 866, ramp portion 868 nor shoulder 870 have any concave surfaces other than at the juncture of end walls 832 with side walls 828 and other than at the juncture of end walls 832 with bottom panel 826. Thus, the interior of pan 816 along end walls 832 prevents the build up of food and bacteria in corners or cavities, allowing pan 816 to be more easily cleaned. In addition, as discussed hereafter with respect to pan 1116 in FIGS. 33A, 33B and 33C, ramp portion 868 also enables pan 816 to achieve an improved seal with a lid.

Figure 21A:
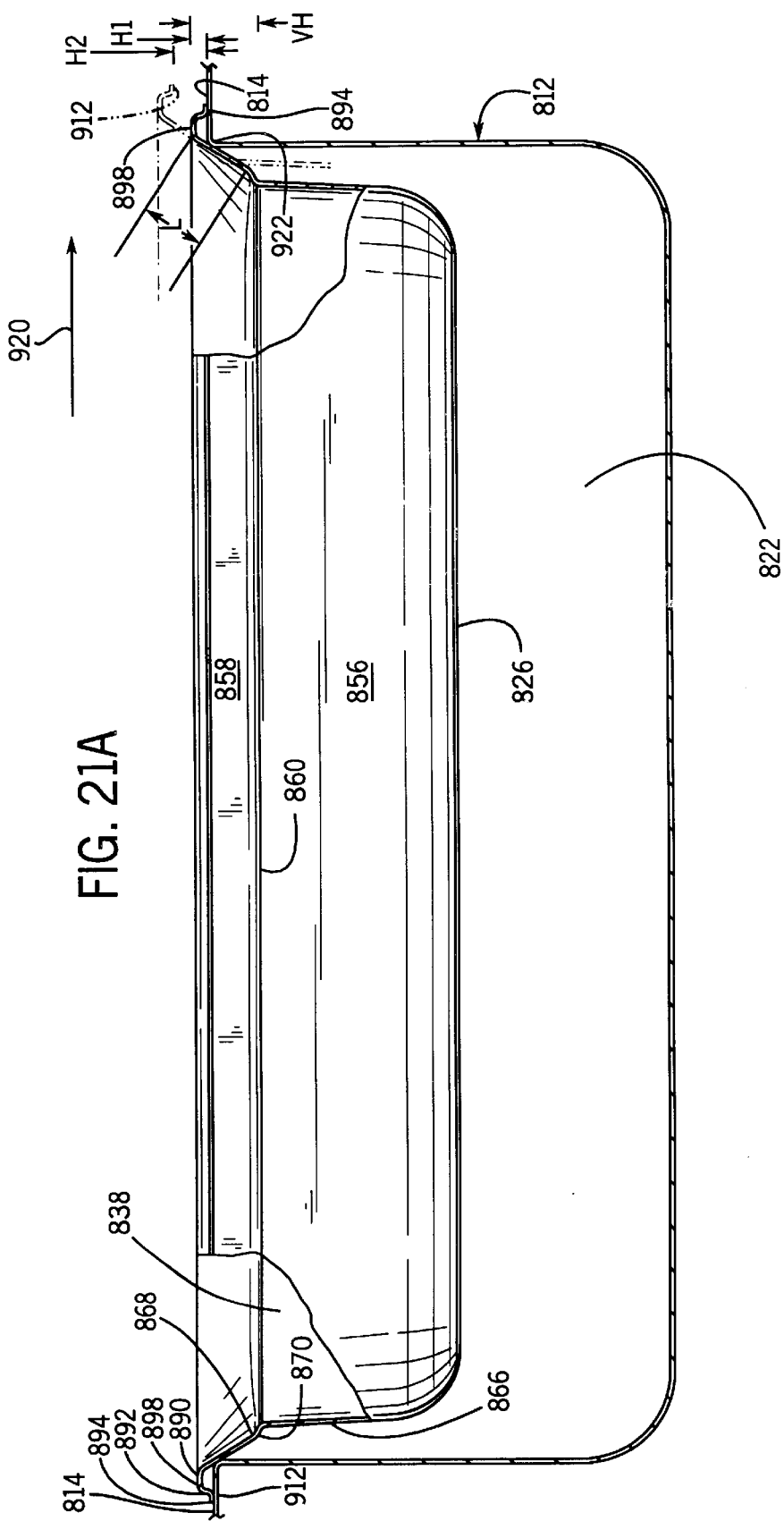
FIG. 21A is a side elevational view of the pan and the well of FIG. 1 with portions shown in section and with the pan shown in phantom during withdrawal of the pan from the well.

FIG. 19 illustrates side rims 846. FIG. 19 and FIG. 21A illustrate end rims 848. Side rims 846 and end rims 848 merge at corners 836. As best shown by FIG. 19, side rims 846 each generally include an outwardly extending portion 880, a down turned portion 882 and a platform engaging portion 884. End rims 848 each generally include an outwardly extending portion 890, a down turned portion 892 and a platform engaging portion 894. Outwardly extending portions 880 and 890 are substantially identical to one another except that outwardly extending portion 880 is wider than outwardly extending portion 890 due to ramp portion 868 reducing the width of outwardly extending portion 890. Outwardly extending portions 880 and 890 extend from upper portion 858 and ramp portion 868, respectively, in a plane substantially parallel to plane 864 of bottom panel 826. Outwardly extending portions 880 and 890 provide landing surfaces 896, 898 against which a lower surface of a lid (not shown) or a lower surface of a gasket secured to a lid (not shown) may rest against to sealably cover interior 838 of pan 816.

As shown by FIG. 19, surface 896 is bounded by an inner edge 902 and outer edge 904. The inner edge extends generally parallel to outer edge 904 from and continuously between adjacent corners 836. Inner edge 902 linearly extends from and between adjacent corners 836 without angular diversions or breaks. As a result, landing surface 896 provides an unbroken sealing surface having a generally constant width against which a sealing gasket or cover may rest.

Similarly, landing surface 898 is bounded by an inner edge 906 and an outer edge 908. Inner edge 906 and outer edge 908 linearly extend parallel to one another from and continuously between adjacent corners 836 without angular diversions or breaks. As a result, landing surface 898 also provides an unbroken sealing surface having a generally constant width against which a sealing gasket or cover may rest.

Down turned portion 882 and platform engaging portion 884 of side rims 846 are substantially identical to down turned portion 892 and platform engaging portions 894 of end rims 848. Down turned portion 892 and platform engaging portion 894 are best illustrated in FIG. 21A. As shown by FIG. 21A, down turned portion 892 extends from outwardly extending portion 890 in a general direction towards bottom panel 826 and preferably at an obtuse angle relative to an underside of outwardly extending portion 890. Platform-engaging portion 894 extends from down turned portion 892 and provides an engagement surface 912 which rests upon platform 814 and forms a general seal with platform 814 to retain steam or heat within cavity 822 of well 812 or to prevent the ingress of heat into cavity 822. In addition to forming a seal with platform 814 about cavity 822, down turned portion 892 and platform engaging portion 894 also strengthen rim 848. As a result, rim 848 is less likely to become dented or accidentally bent when dropped. At the same time, down turned portion 892 and platform engaging portion 894 strengthen rim 848 without the necessity of having a curled rim having a circular cross sectional shape. Consequently, rim 848 omits any crevices where food or bacteria may build up and allows pan 816 to be more easily cleaned for reuse. Down turned portion 882 and platform engaging portion 884 of rim 846 affords similar advantages.

As further shown by FIG. 21A, pan 816 fits within well 812 while only minimally projecting above well 812 and above platform 814. In particular, the uppermost extent of pan 816 (in the exemplary embodiment, landing surface 896 of outwardly extending portion 890) is vertically spaced from platform-engaging surface 912 by a distance H1. Because the uppermost extent of pan 816 is minimally spaced from platform engaging surface 894 and is correspondingly spaced from platform 814 by a minimum distance H1, the top level of food within interior 838 of pan 816 is inset in well 812 to a greater extent. As a result, pan 816 helps maintain proper serving temperatures of the food. In addition, because the uppermost extent of pan 816 minimally extends above platform 814, pan 816 does not interfere with the viewing, accessing or removing of food from interior 838 of pan 816. As a result, pan 816 allows food to be easily accessed when overhead space is limited such as when pan 816 is employed in a steam table or buffet having an overhead shield or "sneeze guard". Preferably, distance H1 should be no greater than 1.0 inches (25.4 mm) and nominally less than 0.5 inches (12.7 mm). In the exemplary embodiment, distance H1 is approximately 0.1875 inches (4.8 mm). Moreover, because pan 816 fits within well 812 and minimally projects above platform 814, food serving system 810 is also more aesthetically pleasing.

Although side rims 846 and end rims 848 are illustrated as including down turned portions and platform engaging portions, side rims 846 and end rims 848 may alternatively omit platform engaging portions 884 and 894, whereby the lower edge of down turned portions 882 and 892 would serve as a platform engaging surface for forming a seal. Although less desirable, side rims 846 and end rims 848 may alternatively omit both down turned portions 882, 892 and platform engaging portions 884 and 894, whereby the lower surface of outwardly extending portions 880 and 890 would serve as a platform engaging surface forming a seal with platform 814.

FIG. 21A illustrates the removal of pan 816 from well 812. As shown in phantom in FIG. 21A, movement of pan 816 in the direction indicated by arrow 920 draws ramp portion 868 against corner 922 adjacent platform 814 such that pan 816 rides up ramp portion 868 to elevate platform engaging surface 912 above platform 814. As a result, a user can secure a hold on pan 816 for complete removal of pan 816 from well 812. As further shown in phantom in FIG. 21A, pan 816 is preferably configured such that when pan 816 is drawn towards corner 922 of well 812 in the direction indicated by arrow 920, platform engaging surface 912 is elevated above platform 814 by a distance H2. Distance H2 is preferably at least 0.375 inches (9.5 mm). To best enable a user to insert his or her fingers and an intermediate insulating layer, such as a washcloth or mitt, beneath platform engaging surface 912, distance H2 preferably is at least 0.625 inches (15.9 mm). To this end, ramp portion 868 preferably has a linear length L of about 1.015 inches (25.8 mm), a vertical height VH of about 0.879 inches (2.23 mm) and an outward slope of about 120 degrees with respect to bottom panel 826. As will now be appreciated, distance H2 may be increased by increasing the linear length L of ramp portion 868 or by decreasing the angle of ramp portion 868 with respect to bottom panel 826.

FIGS. 22–25 illustrate three identical pans 816 stacked and nested with one another. As discussed above, because side walls 828 and end walls 832 generally extend in planes sloped away from interior 838 of pan 816, multiple identical pans 816 may be nested within one another. FIGS. 22 and 23 illustrate three pans 816 nested within one another. The three pans 816 have a height H3 of about 5.46 inches (138.7 mm). As a result, pans 816 may be easily stored when available shelf or other space is limited.

Figure 23A:
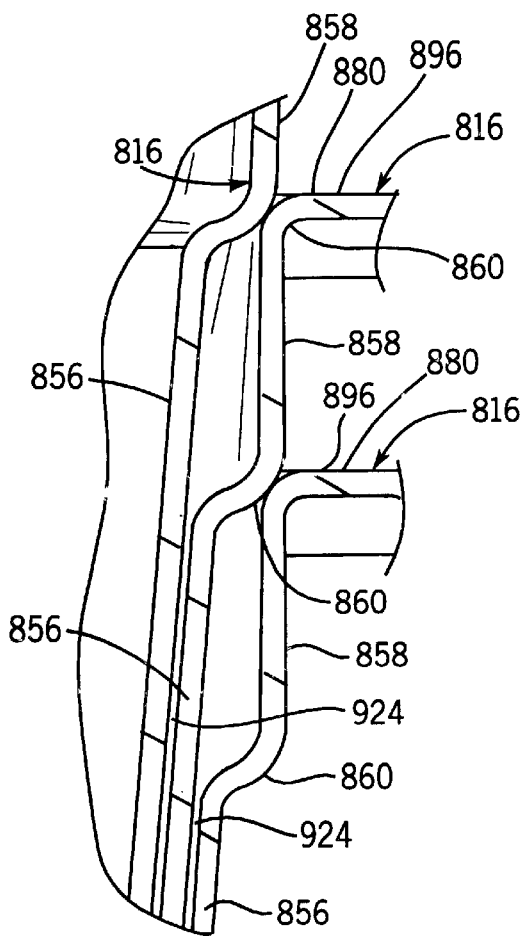
FIG. 23A is a greatly enlarged fragmentary view of the nested plurality of pans of FIG. 23.

As shown in FIG. 23, when pans 816 are nested, shoulders 860 of side walls 828 engage outwardly extending portion 880 of an underlying pan 816 to support pans 816 relative to one another with a lower portion 856 of an underlying pan spaced from an adjacent lower portion 856 of an overlying pan 816 by a gap 924 (best shown in FIG. 23A). In the exemplary embodiment, shoulders 860 are sized and side walls 828 are sloped such that gap 924 preferably has a width of approximately 0.011 inches (0.3 mm). As a result, shoulders 860 of side walls 828 prevent pans 816 from becoming wedged within one another when nested and facilitate non-stick stacking of pans 816.

Figure 25A:
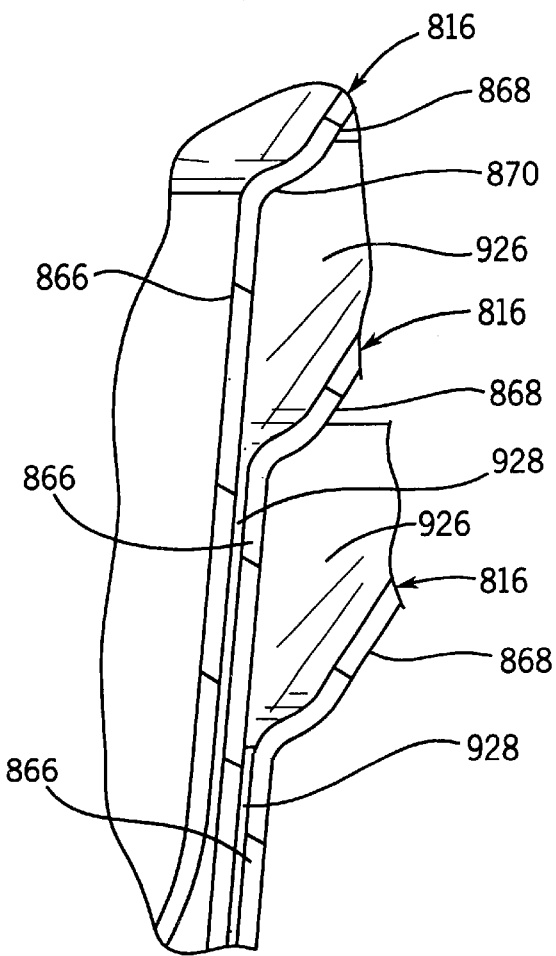
FIG. 25A is a greatly enlarged fragmentary view of the plurality of nested pans of FIG. 25.
Figure 25:
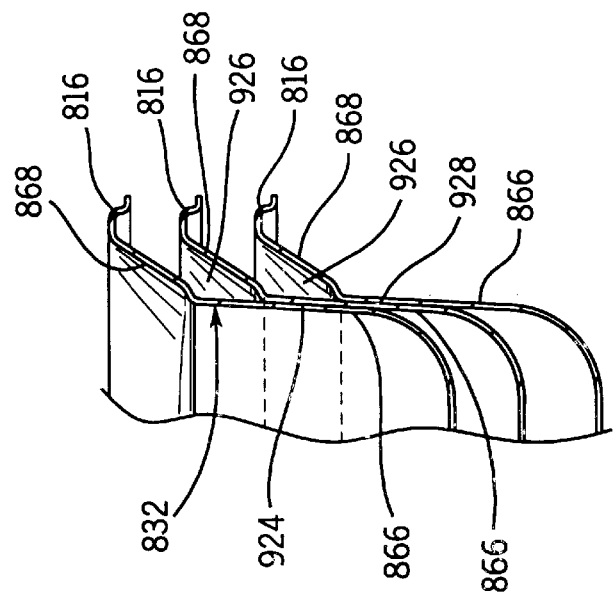
FIG. 25 is a sectional view of the nested plurality of pans of FIG. 24 taken along lines 25—25.
Figure 24:
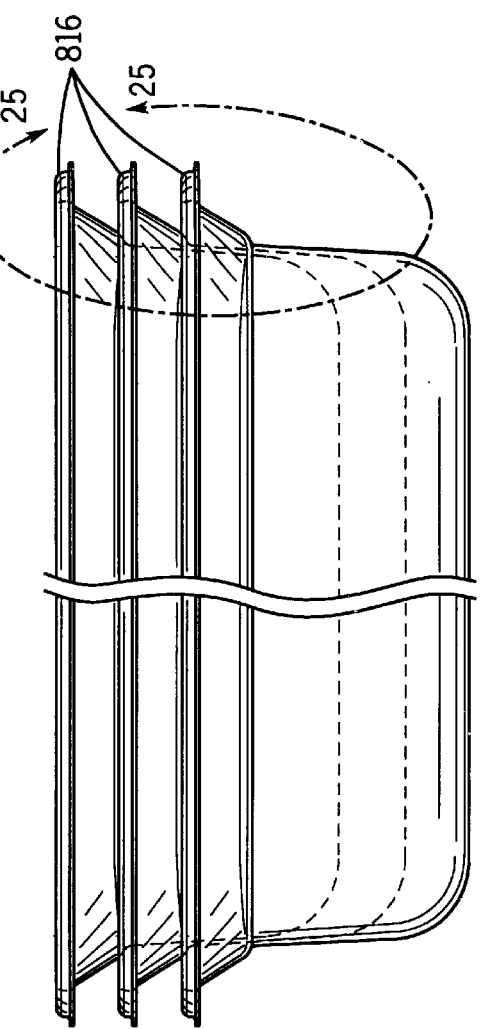
FIG. 24 is a front elevational view of a plurality of the pans nested within one another.

FIGS. 24 and 25 illustrate end walls 832 of three pans 816 stacked and nested within one another. As best shown by FIG. 25, along end walls 832, shoulders 870 do not contact outwardly extending portion 890 of an underlying pan 816 due to ramp portion 868. As best shown in FIG. 25A, when pans 816 are nested, a gap 926 is created between ramp portions 868 of an underlying and overlying pan 816. This gap 926 is in further communication with gap 928 existing between lower portions 866 created by shoulders 860 engaging outwardly extending portions 880 (as shown in FIGS. 22 and 23). Gap 928 is sized similarly to gap 924 and preferably has a width of approximately 0.011 inches (0.3 mm). As a result, air is permitted to easily flow into the spaces between each of nested pans 816 through gaps 926 and 928 to facilitate better airflow and faster drying of pans 816.

Overall, the configuration of pan 816 allows pan 816 to be nested with other identical pans 816 without becoming jammed. In addition to be easily unnested, pans 816 also provide superior airflow for faster drying times after being washed. This is facilitated by pan 816 having at least two opposite walls with lower portion 856, upper portion 858 and shoulder 860, and at least one wall with lower portion 866 and ramp portion 868.

Figure 26:
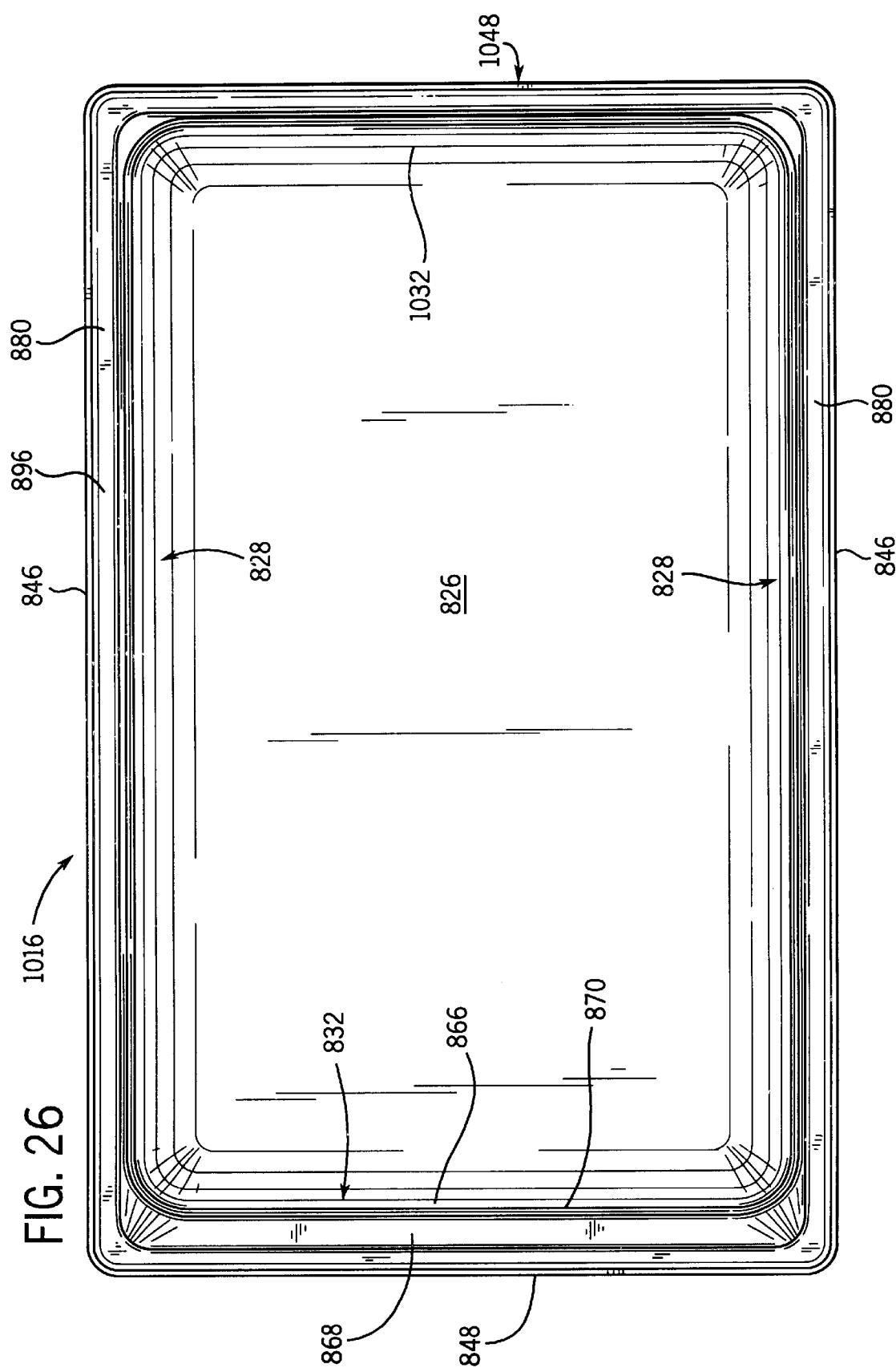
FIG. 26 is a top elevational view of a first alternative embodiment of the pan of FIG. 18.

As shown by FIG. 26, although less aesthetically desirable for lack of symmetry, pans having only a single wall with lower portion 866 and ramp portion 868 in combination with two opposite walls having lower portion 856, upper portion 858 and shoulder 860 also provide the same or near the same advantages. In particular, FIG. 26 illustrates pan 1016, an alternative embodiment of pan 816. Pan 1016 is essentially identical to pan 816 except that pan 1016 replaces one of end walls 832 with end wall 1032 and replaces the adjacent end rim 848 with an alternative adjacent end rim 1048. End wall 1032 and end rim 1048 are essentially identical to side wall 828 and side rim 846, respectively of pan 816. Although less aesthetically desirable for lack of symmetry, side wall 1032 may alternatively omit shoulder 860 since shoulders 860 of side walls 828 support pan 1016 when nested within an underlying pan 1016 to form gaps 924 to provide non-stick stacking of pans 1016.

Although pans 816 and 1016 are both illustrated as including lower portion 866, ramp portion 868 and shoulder 870 on the shorter end walls and as including lower portion 856, upper portion 858 and shoulder 860 on the longer side walls, this relationship may be reversed such that lower portion 866, ramp portion 868 and shoulder 870 extend along one or more longer side walls and such that lower portion 856, upper 858 and shoulder 860 extend along one or more shorter end walls. Although less desirable due to the increased possibility of nested pans becoming jammed, lower portion 866, ramp portion 868 and shoulder 870 may alternatively be provided upon both the shorter end walls and the longer side walls.

FIGS. 27 and 28 illustrate one corner 836 of pan 816 in greater detail. As shown in FIG. 27, the juncture of side wall 828 and end wall 832 is generally rounded. In particular, lower portions 856 and 866 merge with a radius of curvature R1. Shoulders 860, 870 also merge at a rounded juncture with a radius of curvature R1. Ramp portion 868 extends through corner 836 to upper portion 858. In particular, the outward slope of ramp portion 868 gradually decreases until obtaining verticality at upper portion 858. In corner 836, ramp portion 868 and upper 858 merge along a rounded outwardly sloped surface having an upper boundary adjacent the rim with a radius of curvature R2 less than R1. Because radius R2 is less than radius R1, corner 836 provides a narrowing pour spout 930 as shown in FIG. 28. Pour spout 930 enables fluids to easily be poured from pan 816. In the exemplary embodiment, radius R1 is approximately 1.75 inches (44.5 mm) and radius R2 is approximately 0.5 inches (12.7 mm). In smaller pans, radius R1 is reduced to approximately 1.3 inches (33 mm). As further shown by FIG. 19, outwardly extending portions 880 and 890 also merge at corner 836 to form an enlarged corner platform 932. In particular applications, corner platform 932 may be stamped to strengthen and rigidify corner 836 as well as to aesthetically identify a source or supplier of pan 816.

Figure 29:
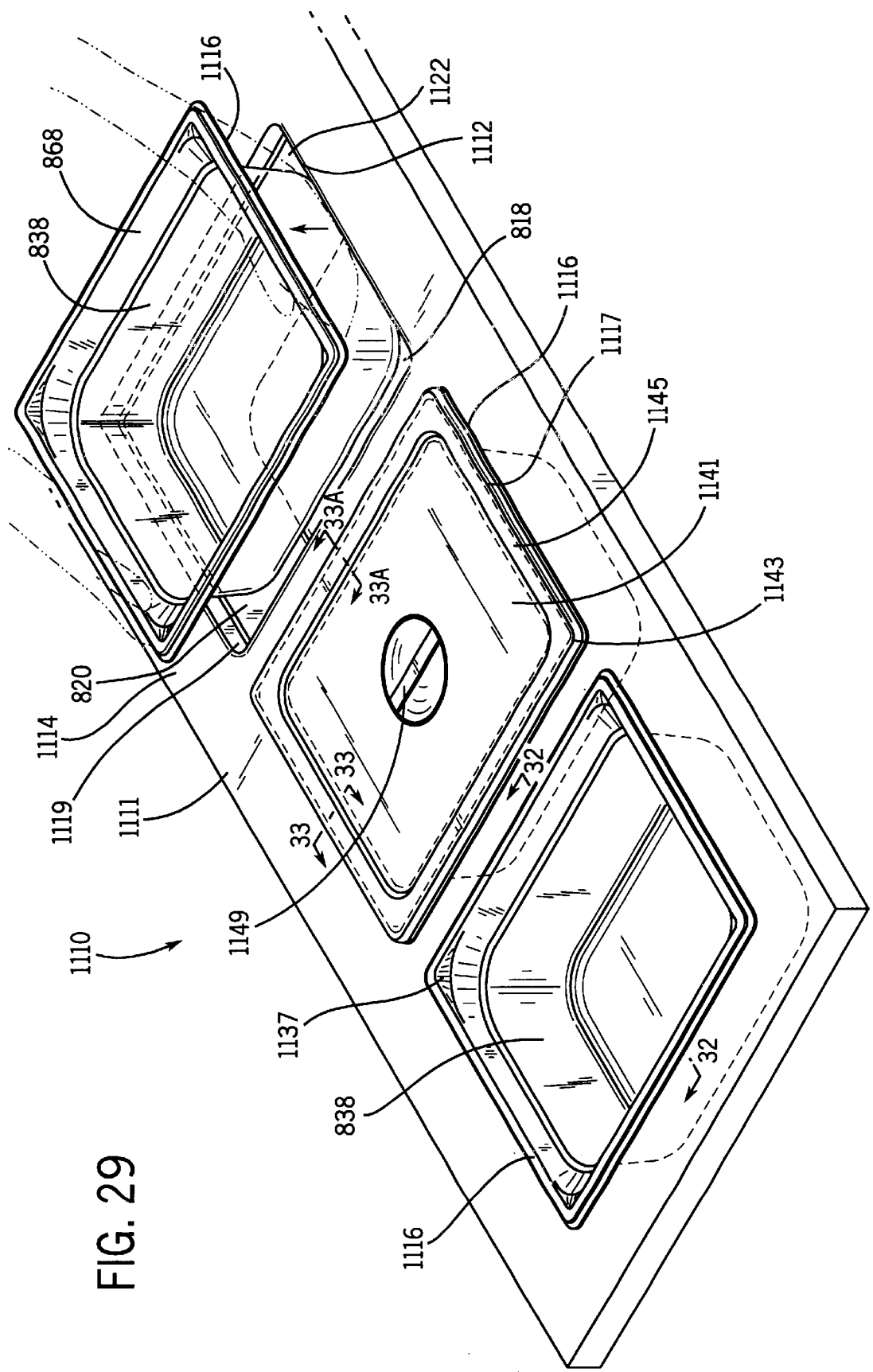
FIG. 29 is a perspective view of a first alternative embodiment of the food serving system of FIG. 18 including a second alternative embodiment of the pan of FIG. 18 positioned within a well and including a lid.

FIG. 29 illustrates food serving system 1110, an alternative embodiment of food serving system 810. Food serving system 1110 generally includes buffet or steam table 1111, pan 1116 and cover or lid 1117. Buffet or steam table 1111 includes a plurality of wells 1112 bordered by a platform 1114. Each well 1112 is essentially identical to well 812 except that side walls 820 are fixedly secured to down turned portions 1119 extending from platform 1114. For ease of illustration, those remaining elements of each well 1112 which correspond to similar elements of well 812 are numbered similarly. As shown by FIG. 29, each well 1112 provides a cavity 1122 sized to receive a pan 1116 such that a portion of pan 1116 rests upon platform 1114 as such that pan 1116 is elevated above bottom panel 818 and above a heat or cold medium such as water or ice.

Figure 30:
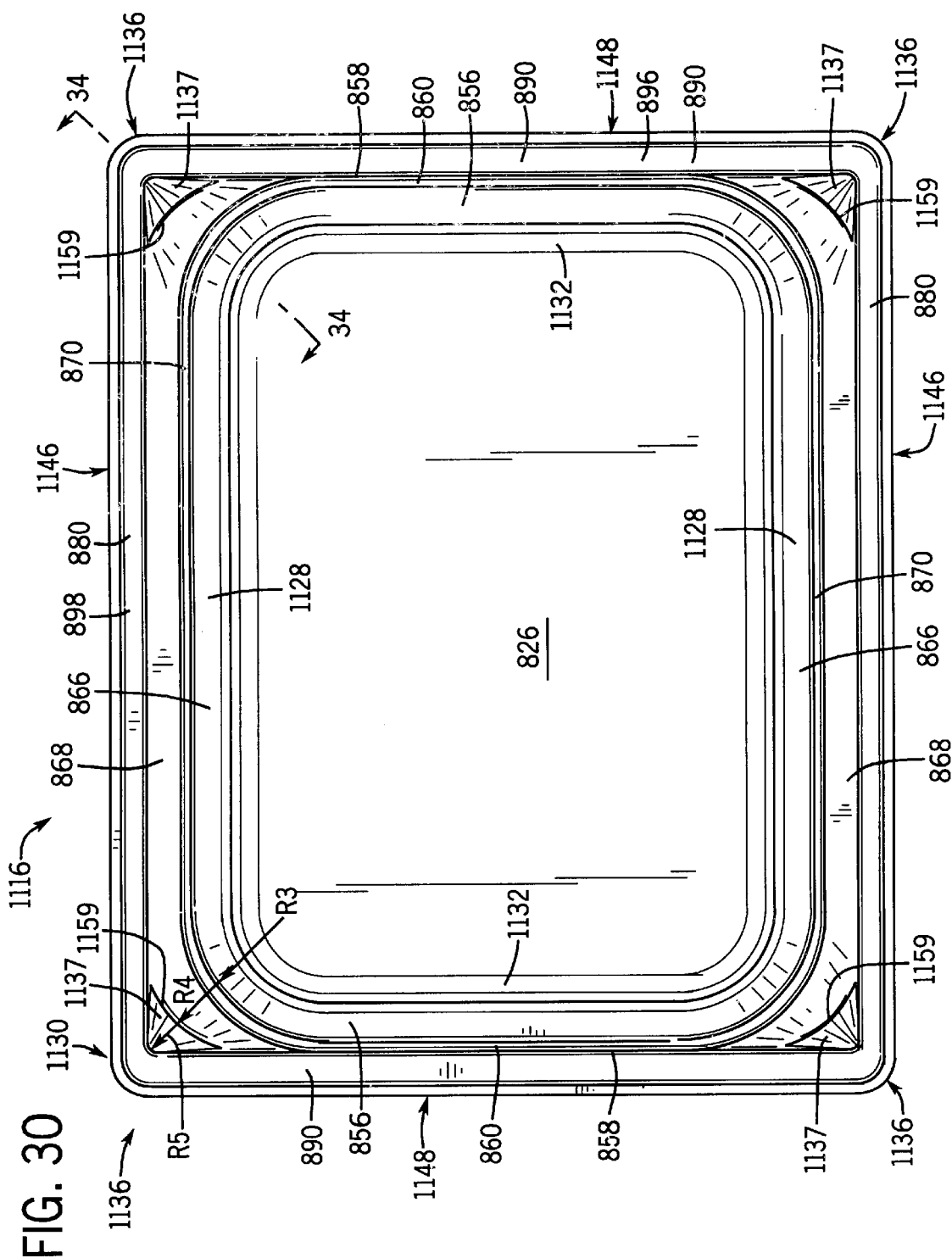
FIG. 30 is a top elevational view of the pan of FIG. 29.
Figure 31:
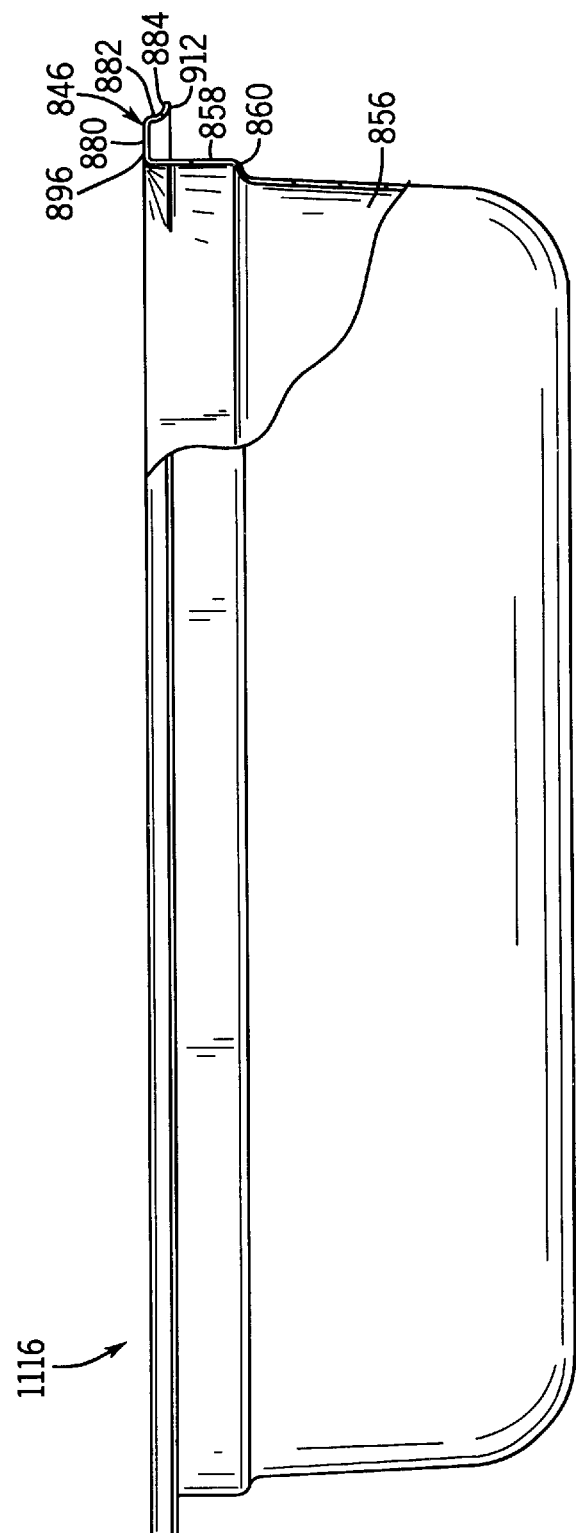
FIG. 31 is a right side elevational view of the pan of FIG. 29 removed from the well and with portions broken away for purposes of illustration.
Figure 32:
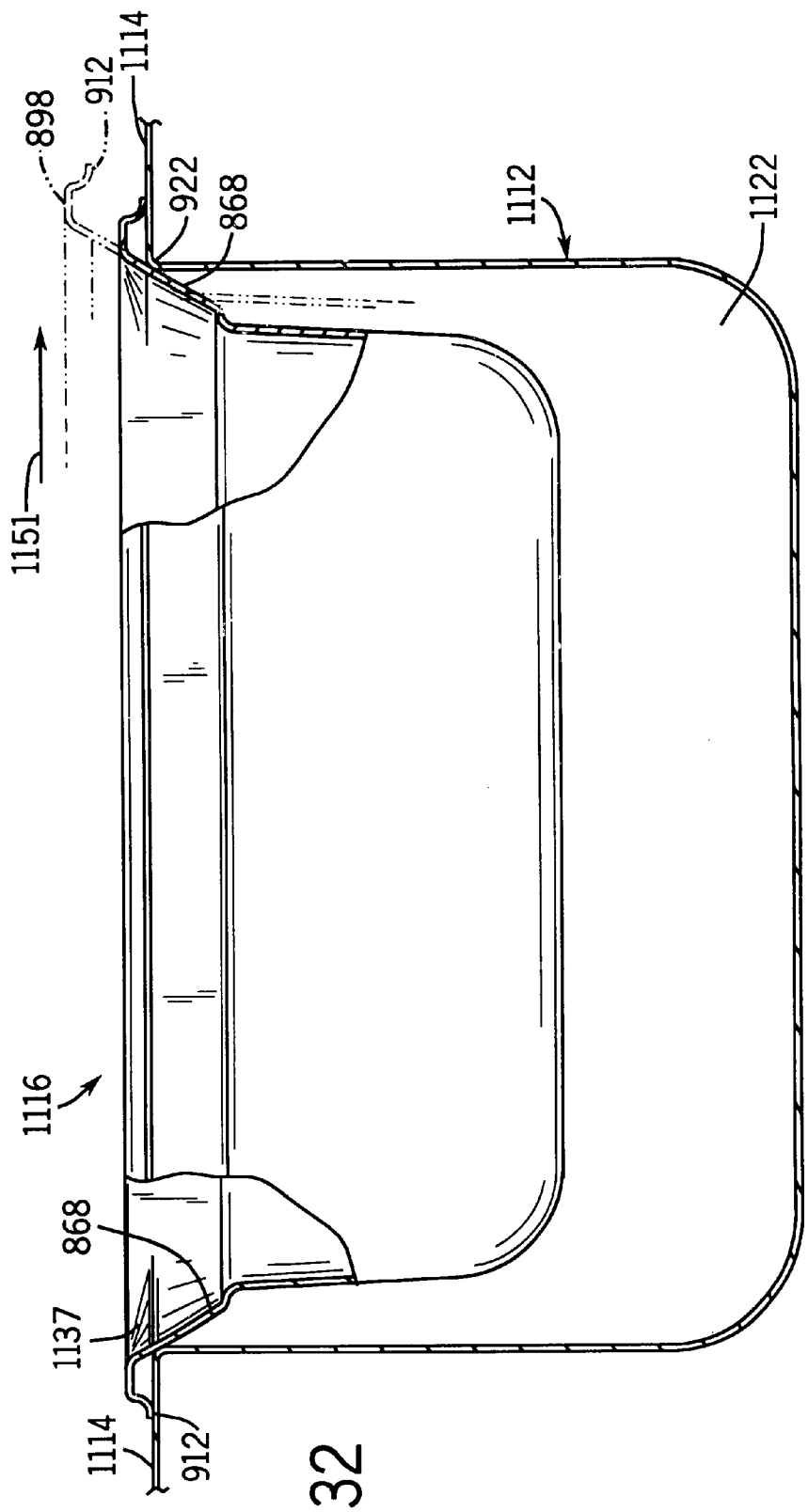
FIG. 32 is a sectional view of the food serving system of FIG. 29 taken along lines 32—32 with the pan shown in phantom during withdrawal of the pan from the well.

FIGS. 30–32 illustrate pan 1116 in greater detail. Pan 1116 is essentially identical to pan 816 (shown and described in FIGS. 18–28) except that pan 1116 includes side walls 1128, end walls 1132, side rims 1146 and end rims 1148 in lieu of side walls 828, end walls 832, side rims 846 and end rims 848, respectively. Pan 1116 further includes an inclined portion 1137 in each of corners 1136. For ease of illustration, those remaining elements of pan 1116 which correspond to pan 816 are numbered similarly.

Side walls 1128 extend along the longer major dimension of pan 1116 and are substantially identical to end walls 832 of pan 816. In particular, each side wall 1128 includes lower portion 866, ramp portion 868 and shoulder 870 as described above. Likewise, end walls 1132 are substantially identical to side walls 828 of pan 816 and include lower portion 856, upper portion 858 and shoulder 860 as described above. Side rims 1146 are substantially identical to end rims 848 of pan 816 while end rims 1148 are substantially identical to side rims 846 of pan 816. As a result, pan 1116 provides several of the same advantages as does pan 816. In particular, as shown by FIG. 32, pan 1116 may be easily withdrawn from well 1112 by simply moving pan 1116 in the direction indicated by arrow 1151 to draw ramp portion 868 of side wall 1128 against corner 922 adjacent platform 1114 such that pan 1116 rides up on ramp portion 868 to elevate platform engaging surface 912 above platform 1114 to a sufficient extent such that the user may secure a strong hold on pan 1116 to lift pan 1116 from well 1112.

Like pan 816, pan 1116 includes lower surface 856, upper surface 858 and shoulder 860 on at least two opposing walls (end walls 1132) and lower portion 866 and ramp portion 868 on at least one intermediate wall (side walls 1128). As a result, pan 1116 also provides non-stick stacking and nesting of multiple identical pans 1116 and provides improved airflow between ramp portion 868 for faster drying of pans 1116 when nested.

Like pan 816, pan 1116 has ramp portion 868 which provides ramp surfaces that extend across a midpoint between opposite sides of pan 1116 such that during withdrawal of pan 1116 from well 1112, adjacent corners 1136 are simultaneously and uniformly lifted or elevated above platform 1114. Like pan 816, pan 1116 preferably includes ramp portion 868 that continuously extend from corner 1136 to an adjacent corner 1136 to eliminate any corners or cavities where food and bacteria may gather such that pan 1116 is easier to clean. Like pan 816, pan 1116 has narrowing radii in its corners 1136 to provide a pour spout. In particular, each corner 1136 of pan 1116 has a lower radius R3, a smaller intermediate radius R4 and an even smaller upper radius R5 which form pour spout 1130. In the exemplary embodiment, radius R3 is approximately 1.75 inches (44.5 mm); radius R4 is approximately 1.18 inches (30 mm) and radius R5 is approximately 0.125 inches (3.2 mm).

Like pan 816, pan 1116 has strong side rims 1146 and end rims 1148 without having curled edges which would otherwise increase cleaning difficulty. Like pan 816, pan 1116 includes continuously extending, uninterrupted landing surfaces 896, 898 which are bordered by linearly extending inner and outer edges and which have a uniform thickness from one corner 1136 to an adjacent corner 1136 such that the lower surface of a lid or a lower surface of a gasket attached to a lid may form an adequate and reliable seal against landing surfaces 896 and 898 to preserve the temperature or freshness of food within interior 838 of pan 1116.

FIG. 33 illustrates lid 1117 interacting with landing surface 896 and the interior surface of upper portion 858 to seal interior 838 of pan 1116 positioned within well 1112. FIG. 33A illustrates lid 1117 interacting with landing surface 898 and the surface of ramp portion 868 to seal interior 838 of pan 1116 positioned within well 1112. Lid 1117 generally includes central portion 1141, lid rim 1143 and gasket 1145. Central portion 1141 spans interior 838 between side walls 1128 and end walls 1132. Central portion 1141 preferably extends slightly below landing surface 896 and slightly below landing surface 898. As shown in FIG. 29, central portion 1141 may additionally include a handle 1149.

Lid rim 1143 extends from central portion 1141 about substantially an entire perimeter of central portion 1141. Lid rim 1143 generally includes an upturned portion 11511 an outwardly extending portion 1153, a downwardly extending portion 1155 and an outturned edge 1157. Portions 1151, 1153 and 1155 wrap about landing surfaces 896, 898 to securely retain lid 1117 on pan 1116 and to provide an improved seal. Edge 1157 increases the rigidity of rim 1143.

Gasket 1145 is fixedly secured to an underside of rim 1143 and is located so as to extend opposite to landing surfaces 896 and 898, upper portion 858 and ramp portion 868 when lid 1117, is placed over pan 1116. Gasket 1145 extends substantially about an entire perimeter of lid 1117. Gasket 1145 is preferably formed from a conventionally known compressible material such as an elastomer or rubber and is preferably heat resistant and safe for use with foods. In the exemplary embodiment, gasket 1145 is formed from silicone rubber.

As shown by FIG. 33, when lid 1117 is placed upon pan 1116, gasket 1145 rests upon landing surfaces 896 and 898, upper portion 858 and ramp portion 868 to form a seal. Gasket 1145 generally includes body 1147, rim engaging portion 1149 and side finger 1150. Body 1147 is secured to an underside of center portion 1147 and rim 1143 at a spaced location from pan 1116. Rim engaging portion 1149 extends outwardly from body 1147 beneath rim 1143 so as to wrap about and rest upon rim 1148 as shown in FIG. 33A. Rim engaging portion 1149 provides a lesser seal against rims 1146 and 1148 and reduces noise when lid 1117 is placed upon pan 1116 or when lid 1117 moves relative to pan 1116.

Finger 1150 projects from body 1147 into engagement with the interior surface of upper portion 858 as shown in FIG. 33 and into engagement with the surface of ramp portion 868 as shown in FIG. 33A. As shown in FIG. 33, finger 1150 is simply pressed in place against upper portion 858 and resiliently flexes outward into engagement with upper portion 858 to form a seal. As shown in FIG. 33A, finger 1150 is wedged downward against ramp portion 868. As a result, finger 1150 has an improved seal when wedged against ramp portion 868. As shown in FIG. 33B, finger 1150 functions as a living hinge in that finger 1150 pivots between a first ramp portion engaging position shown in FIG. 33A to a disengaged position. In this disengaged position, built up pressure and steam within interior 838 of pan 1116 is allowed to escape past finger 1150. The built up pressure is sufficient enough to also slightly lift and pass between either rims 1146, 1148 and rim engaging portion 1149. Thus, finger 1150 and gasket 1145 provide a pressure release mechanism. It has been discovered that ramp portion 868 facilitates the pivoting of finger 1150 to avoid excess pressure built up and to avoid lid 1117 from being abruptly expelled from pan 1116. Although less desirable, gasket 1145 may be omitted whereby the underside of outwardly extending portion 1153 mates with landing surfaces 896 and 898 to provide a lesser seal.

FIG. 34 illustrates inclined portion 1137 in corner 1136 in greater detail. As shown by FIG. 34, inclined portion 1137 generally extends between the juncture of ramp portion 868 and upper portion 858 and the junction of outwardly extending portions 880 and 890, platform 932, at corner 1136. Inclined portion 1137 extends above ramp portion 868 as ramp portion 868 approaches a vertical orientation while merging with upper portion 858. Inclined portion 1137 extends at an angle A4 to ramp portion 868 in corner 1136 outwardly towards platform 932. As shown by FIG. 30, inclined portion 1137 has a lower boundary that extends along an arc 1159 between an adjacent side wall 1128 and an adjacent end wall 1132. Arc 1159 has a minimum radius of at least about 1.18 inches (30 mm) and a maximum radius of at least about 3.15 inches (80 mm.) In the exemplary embodiment, arc 1159 has a radius of approximately 1.18 inches (30 mm). Inclined portion 1137 and its lower boundary extending along arc 1159 reduce the outer most radius of each of corners 1136, enabling pan 1116 to meet uniformity standards generally imposed upon steam table pans, such as European standard EN-631-1 for Catering Containers, hereby incorporated by reference. At the same time, inclined portion 1137 enables ramp portion 868 to continue to extend through corners 1136, resulting in easier cleaning of pan 1116 and also resulting in an improved aesthetic appearance of pan 1116.

FIG. 35 is a perspective view illustrating food serving system 1210, an alternative embodiment of food serving system 810 shown and discussed with respect to FIGS. 18–28. Food serving system 1210 generally comprises a food serving chafer including stand 1213, water pan 1215, heat source 1219 and pan 1116. Stand 1213 comprises a conventionally known chafer stand configured to support and elevate water pan 1215 above a surface 1221 such as a countertop, table or the like.

Water pan 1215 comprises a conventionally known water pan configured for use with chafers. Water pan 1215 generally includes bottom panel 1218, upwardly extending walls 1220 and rim 1223 which provides platform 1214. Bottom panel 1218 and walls 1220 define an internal cavity 1222 sized to receive pan 1116. Rim 1223 extends outwardly from walls 1220 about a perimeter of pan 1214 to provide platform 1215 upon which platform engaging surface 912 rests and seals thereagainst.

Heat source 1219 is located beneath water pan 1215 and applies heat to warm the contents of interior 1222 of water pan 1215. Heat source 1219 preferably comprises a pair of conventionally known burners supported by stand 1213. As will be appreciated, various other heat sources may be used in lieu of burners.

In use, water pan 1215 is filled with water and is placed upon stand 1213 above heat source 1219. Pan 1116, filled with food, is positioned within cavity 1222 of pan 1215. Heat source 1219 elevates the temperature of the water within cavity 1222 to continually heat the underside of pan 1116 and to thereby maintain the elevated temperature of the food within interior 838 of pan 1116. Pan 1116 may be withdrawn from water pan 1216, which serves as a well, by simply moving pan 1116 in a direction such that ramp portion 868 rides up against the corner (not shown) at the juncture of adjacent rim 1223 so to elevate platform engaging surface 912 a sufficient extent such that the user can gain a grasp upon pan 1116.

Figure 36:
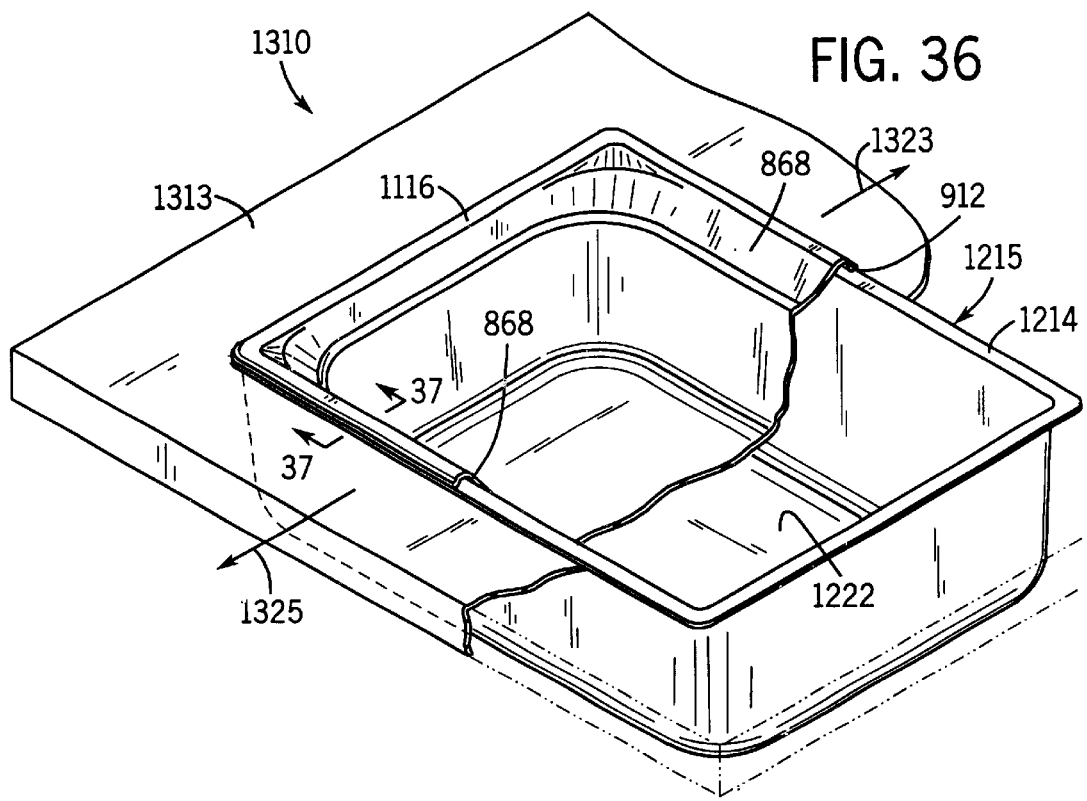
FIG. 36 is a perspective view of a third alternative embodiment of the food serving system of FIG. 1 with portions broken away for purposes of illustration.
Figure 37:
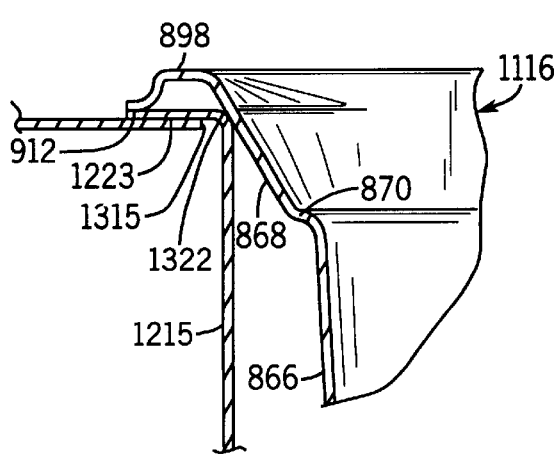
FIG. 37 is a sectional view of the food serving system of FIG. 36 taken along lines 37—37.

FIGS. 36 and 37 illustrate food serving system 1310, an alternative embodiment of food serving system 810. Food serving system 1310 generally includes counter 1313, water pan 1215 and pan 1116. Counter 1313 comprises a countertop having a cutout or opening 1315 therewithin sized to receive water pan 1215 such that rim 1223 of water pan 1215 supports water pan 1215 within opening 1315. Water pan 1215 is preferably removable from opening 1315 for cleaning and for being filled with water. In use, water pan 1215 is either filled with water and then inserted into opening 1315 or is positioned within opening 1315 and then filled with water. The water is preferably at an elevated temperature such that once food filled pan 1116 is positioned within cavity 1222, the temperature of the food within pan 1116 is maintained. Alternatively, a chilled medium, such as ice, is positioned within cavity 1222 prior to food filled pan 1116 being positioned within cavity 1222. The chilled medium chills or maintains the low temperature of the food within pan 1116. To remove pan 1116 from water pan 1215, a user simply moves pan 1116 in the direction indicated by either of arrows 1323 or 1325 until ramp portion 868 rides up against corner 1322 of water pan 1215 adjacent rim 1223 so as to elevate the platform engaging surface 912 above platform 1214 and above counter 1313 to an extent sufficient such that the user may obtain a grasp of pan 1116.

Figure 38:
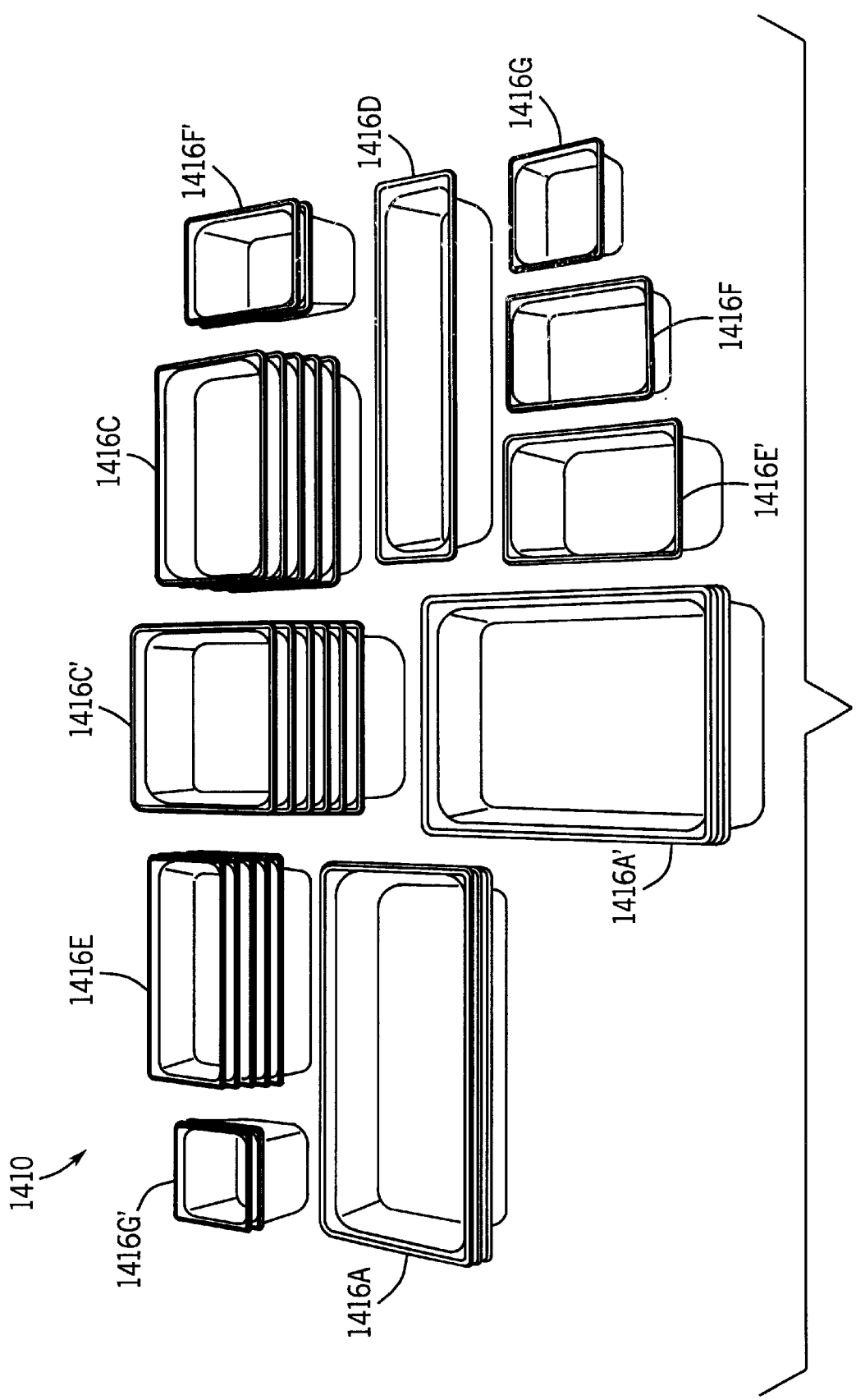
FIG. 38 is a perspective view of a pan system of the present invention.

FIGS. 38 and 39 illustrate pan system 1410. Pan system 1410 includes a plurality of pans 1416A, 1416A', 1416B (shown in FIG. 39), 1416C, 1416C', 1416D, 1416E, 1416E', 1416F, 1416F', 1416G, and 1416H (shown in FIG. 39). Each of pans 1416A–1416H are substantially identical to pan 1116 except that each of pans 1416A–1416H have differently sized side walls and end walls. As schematically represented in FIG. 39, pan 1416A is a full-size pan having a width dimension X and a length dimension Y, where X and Y are measurement values. Pan 1416C has a width dimension X and a length dimension Y. Pan 1416D has a width dimension 1/2X and a length dimension Y. Pan 1416E has a width dimension X and a length 1/3Y. Pan 1416F has a width dimension 1/2X and length dimension 1/2Y. Pan 1416G has a width dimension 1/2X and a length 1/3Y. Pans 1416A', 1416C', 1416E' and 1416F' have similar width and length dimensions as compared to pans 1416A, 1416C, 1416E and 1416F, respectively, but have increased depth dimensions. Although not illustrated in FIG. 38, pan 1416B has a width dimension X and a length dimension 2/3Y. Pan 1416H (as shown in FIG. 39) has a width dimension 1/3X and a length dimension 1/3Y.

Pan system 1410 provides a uniform series of pans for use in differently sized openings in buffet or steam tables, chafers, marmites, or other structures providing a well into which pans 1416 may be partially inserted. Although pans 1416A–1416H are illustrated as consisting of multiple differently dimensioned pans identical to pan 1116, pans 1416A–1416H may alternatively comprised differently dimensioned pans identical to pan 816 or pan 1016. With the above noted dimensional changes, pan system 1410 provides precise predetermined food portion control. In the exemplary embodiment, pan 1416A has a width dimension X of approximately 12.75 inches (323.9 mm) and a length dimension Y of approximately 20.75 inches (527.1 mm). Each of pans 1416A, 1416B, 1416C, 1416D and 1416E may have depth ranging from 1.25 inches (31.8 mm), 2.5 inches (63.5 mm), 4.0 inches (101.6 mm) and 6.0 inches (152.4 mm). Pans 1416F and 1416G have depth selected from 2.5 inches (63.5 mm), 4.0 inches (101.6 mm), and 6.0 inches (152.4 mm) and 8.0 inches (203.2 mm). Pan 1416H has a depth selected from 2.0 inches (50.8 mm) and 4.0 inches (101.6 mm).

Each of pans 816, 1016 and 1116 are preferably formed from a single sheet of 24 gauge to 20 gauge stainless steel. As a result, each of pans 816, 1016 and 1116 is capable of withstanding extremely high temperatures (typically greater than that of plastic) and strong enough to be reused while not requiring multiple gussets or curls for strength which would otherwise impede cleaning of such pans. Alternatively, each of pans 816, 1016 and 1116 is formed from a rigid plastic material. The rigid plastic material is preferably capable of withstanding temperatures of up to 310 degrees Fahrenheit. Preferably, the plastic material comprises polyetherimide. Alternatively, pans 816, 1016 and 1116 may be formed from other rigid plastic materials such as polycarbonate, capable of withstanding temperatures of up to 210 degrees Fahrenheit. Although generally less tolerable to heat, pans 816, 1016 and 1116 formed from plastic may be formed from other processes in addition to drawing and stamping, whereby pans 816, 1016 and 1116 may be provided with a smooth interior surface omitting cavities or concave surfaces and yet provided with an outer surface having gussets or curls to improve strength or to improve the aesthetics of the pan. Pans 816, 1016 and 1116 will preferably have a thickness of about 0.1 inches (2.5 mm) when formed from plastic. In those pans 816, 1016 and 1116 formed from plastic, portions of each pan may have reduced or increased thickness to provide strength in particular portions of the pan such as in the corners. Although less desirable due to manufacturing costs and pan integrity, pans 816, 1016 and 1116 may alternatively be formed from multiple pieces which are fixed or otherwise bonded to one another.

Although the present invention has been described with reference to preferred embodiments, workers skilled in the art will recognize that changes may be made in form and detail without departing from the spirit and scope of the invention. Those skilled in the art will appreciate that certain of these advantages can be obtained separately through reconfiguring the foregoing structure without departing from the spirit and scope of the present invention. Because the technology of the present invention is relatively complex, not all changes in the technology are foreseeable. The present invention described with reference to the preferred embodiments and set forth in the following claims is manifestly intended to be as broad as possible. For example, unless specifically otherwise noted, the claims reciting a single particular element also encompass a plurality of such particular elements.

What is claimed is:

1. A pan for use with a well for receiving the pan, the well being surrounded by a platform, the pan comprising:
   a bottom panel;
   a plurality of walls extending upwardly from the bottom panel, the plurality of walls including a first wall, a second wall, and a third wall joined to the first and second walls at first and second corners, respectively; and
   a rim outwardly extending from the third wall;
   wherein the third wall includes:
      a first lower portion proximate the bottom panel and extending at a first angle relative to the bottom panel; and
      a ramp portion extending between the lower portion and the rim at a second angle oblique to the lower portion and between about 105 degrees and about 150 degrees relative to the bottom panel, the ramp portion extending across a midpoint of the third wall between the first and second corners.

2. The pan of claim 1, wherein at least a portion of the rim extends generally parallel to the bottom panel.

3. The pan of claim 1, wherein at least a portion of the rim extends downwardly and outwardly from the third wall such that the rim is adapted to engage the platform when the pan is positioned within the well.

4. The pan of claim 1, wherein the rim includes a first rim portion extending generally parallel to the bottom panel; and a second rim portion extending downwardly from the first portion, whereby the second portion is adapted to engage the platform when the pan is positioned within the well.

5. The pan of claim 1, wherein the ramp portion continuously extends from the first corner to the second corner.

6. The pan of claim 1, wherein the first lower portion extends in a plane oblique to the bottom panel.

7. The pan of claim 6, wherein the first lower portion extends in a plane extending at an angle of about 93 degrees with respect to the bottom panel.

8. The pan of claim 1, wherein the ramp portion of the third wall continuously extends through the first corner from the third wall to the first wall.

9. The pan of claim 8 including an inclined portion in the first corner extending at an angle oblique to the ramp portion from the ramp portion outwardly towards the rim.

10. The pan of claim 9, wherein the juncture of the ramp portion and the inclined portion extends along an arc between the first and third walls.

11. The pan of claim 10, wherein the arc has a minimum radius of at least about 30 millimeters and a maximum radius of at least about 80 millimeters.

12. The pan of claim 1, including a shoulder extending between the lower portion and the ramp portion.

13. The pan of claim 1, wherein the first wall includes:

a second lower portion extending generally at the first angle from the bottom panel; and a first upper portion extending between the second lower portion and the rim, the first upper portion extending at a third angle less than the second angle with respect to the bottom panel.

14. The pan of claim 13, wherein the second wall includes:

a third lower portion extending generally at the first angle from the bottom panel; and a second upper portion extending between the third lower portion and the rim, the second upper portion extending at a fourth angle less than the second angle with respect to the bottom panel.

15. The pan of claim 14, wherein the third angle and the fourth angle at which the first upper portion and the second upper portion extend relative to the bottom panel are equal.

16. The pan of claim 14, wherein the third angle at which the first upper portion extends relative to the bottom panel is between about 90 degrees and about 93 degrees.

17. The pan of claim 13 including a shoulder between the second lower portion and the upper portion.

18. The pan of claim 1 including a shoulder extending between the first lower portion and the ramp portion.

19. The pan of claim 1, wherein the pan is formed from stainless steel.

20. The pan of claim 16, wherein the pan is formed from a single sheet of twenty-two gauge to twenty-four gauge stainless steel.

21. The pan of claim 1, wherein the pan is formed from a polymer.

22. The pan of claim 1, wherein the rim provides a horizontal surface extending parallel to the bottom panel continuously from the first corner to the second corner, wherein the horizontal surface is bounded by an inner edge and an outer edge and wherein the inner edge and the outer edge extend parallel to one another from the first corner to the second corner.

23. The pan of claim 1, wherein the rim provides a horizontal surface extending from the first corner to the second corner, wherein the horizontal surface is bounded by an inner edge and wherein the inner edge linearly extends from the first corner to the second corner.

24. The pan of claim 1, wherein the rim terminates along a non-curled outer edge.

25. The pan of claim 1, wherein the lower portion of the third wall has an inner surface facing the pan interior and wherein the inner surface extends in a single plane from the first corner to the second corner, whereby the inner surface lacks surface cavities.

26. The pan of claim 1, wherein the rim includes an engagement surface adapted to engage the platform when the pan is placed within the well and wherein the pan extends above the engagement surface less than 1.0 inches (25.4 mm).

27. The pan of claim 1, wherein the first corner has a lower arcuate portion having a first radius and an upper portion having a second smaller radius, whereby the first corner provides a pour spout for the pan.

28. The pan of claim 1, wherein the second angle at which the ramp portion extends between the lower portion and the rim is between about 120 degrees and about 135 degrees.

29. The pan of claim 1, wherein the rim has a support surface adapted to engage the platform to support the pan within the well and wherein the ramp portion includes an exterior sloped surface, at least a portion of which extends horizontally across from and below the support surface and also extends outwardly beyond an outermost surface of the third wall.

30. The pan of claim 1, wherein the ramp portion has a linear length such that the ramp portion has a vertical height of at least about 0.375 inches (9.5 mm).

31. The pan of claim 30, wherein the ramp portion extends outwardly at an angle of about 120 degrees relative to the bottom panel.

32. The pan of claim 1, wherein the ramp portion has a linear length such that the ramp portion has a vertical height of at least 0.625 inches (15.9 mm).

33. The pan of claim 1, wherein the ramp portion has a linear length of at least 1.0 inches (25.4 mm).

34. The pan of claim 1, wherein the ramp portion has a vertical height of at least 0.8 inches (20.3 mm).

35. The pan of claim 1, wherein the pan is formed from a polymer capable of withstanding temperatures up to 210 degrees Fahrenheit.

36. The pan of claim 1, wherein the pan is formed from a polymer capable of withstanding temperatures up to 310 degrees Fahrenheit.

37. The pan of claim 1, wherein the pan is formed from a rigid plastic selected from the group including:

polyetherimide or polycarbonate.

38. A pan system for serving food, the system comprising:

a plurality of identical pans, each pan adapted for use with a well for receiving the pan, the well being surrounded by a platform, each pan including:

a bottom panel;

a plurality of walls extending upwardly from the bottom panel, the plurality of walls including a first wall, a second wall, and a third wall joined to the first and second walls at first and second corners, respectively; and a rim outwardly extending from the third wall;

wherein the third wall includes:

a first lower portion proximate the bottom panel and extending at a first angle relative to the bottom panel; and a ramp portion extending between the lower portion and the rim at a second angle oblique to the lower portion, wherein the first angle at which the lower portion extends relative to the bottom panel is oblique to the bottom panel such that the plurality of pans are nestable within one another.

39. The system of claim 38, wherein the plurality of pans includes a first pan, a second pan and a third pan, wherein each pan has a height of about 3.9 inches (99.1 mm) and wherein the first pan, the second pan and the third pan, when nested, have a maximum height of about 5.46 inches (138.7 mm).

40. The system of claim 38, wherein the second angle at which the ramp portion obliquely extends relative to the lower portion is between about 105 degrees and about 150 degrees relative to the bottom panel.

41. The system of claim 39, wherein the ramp portion extends across a mid-point of the third wall between the first and second corners.

42. A food serving system comprising:
  a series of pans, each pan including:
    a bottom panel;
    a plurality of walls extending upwardly from the bottom panel, the plurality of walls including a first wall, a second wall, and a third wall joined to the first and second walls at first and second corners, respectively; and
    a rim outwardly extending from the third wall;
    wherein the third wall includes:
      a lower portion proximate the bottom panel and extending at a first angle relative to the bottom panel; and
      a ramp portion extending between the lower portion and the rim at a second angle oblique to the lower portion;
  wherein the series of pans includes a first rectangular pan having a width dimension X and a length dimension Y;
  a second rectangular pan having a width dimension X and a length dimension one-half Y; and
  a third rectangular pan having a width dimension one-half X and a length dimension one-half Y.

43. The system of claim 42 including a fourth rectangular pan having a width dimension of one-half X or one-third X and a length dimension of two-thirds Y or one-third Y.

44. A pan for use with a well for receiving the pan, the well being surrounded by a platform, the pan comprising:
  a bottom panel;
  a plurality of walls extending upwardly from the bottom panel, the plurality of walls including a first wall, a second wall, and a third wall joined to the first and second walls at first and second corners, respectively; and
  a rim outwardly extending from the third wall;
  wherein the third wall includes:
    a lower portion proximate the bottom panel and extending at a first angle relative to the bottom panel; and
    a ramp portion extending between the lower portion and the rim at a second angle oblique to the lower portion and between about 105 degrees and about 150 degrees relative to the bottom panel, wherein the ramp portion has a linear length such that the ramp portion has a vertical height of at least about 0.375 inches (9.5 mm).

45. The pan of claim 44, wherein the ramp portion has a linear length such that the ramp portion has a vertical height of at least about 0.625 inches (15.9 mm).

46. The pan of claim 44, wherein the ramp portion has a linear length of at least about 1.0 inches (25.4 mm).

47. The pan of claim 44, wherein the ramp portion has a vertical height of at least about 0.8 inches (20.3 mm).

48. The pan of claim 44, wherein the ramp portion outwardly extends at an angle of about 120 degrees relative to the bottom panel.

* * * * *